US011917222B1

(12) United States Patent
ReMine et al.

(10) Patent No.: US 11,917,222 B1
(45) Date of Patent: Feb. 27, 2024

(54) DETERMINING VISUAL CONTENT OF MEDIA PROGRAMS FROM SCRIPTS

(71) Applicant: Amazon Technologies, Inc., Seattle, WA (US)

(72) Inventors: Daniel Stephen ReMine, Seattle, WA (US); Najmeh Sadoughi Nourabadi, Newcastle, WA (US); Chengyuan Liu, Raleigh, NC (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/064,755

(22) Filed: Dec. 12, 2022

(51) Int. Cl.
*H04N 21/235* (2011.01)
*G06F 40/205* (2020.01)
*G06F 40/279* (2020.01)
*H04N 21/488* (2011.01)

(52) U.S. Cl.
CPC ......... *H04N 21/235* (2013.01); *G06F 40/205* (2020.01); *G06F 40/279* (2020.01); *H04N 21/4884* (2013.01)

(58) Field of Classification Search
CPC .............. H04N 21/235; H04N 21/4884; G06F 40/205; G06F 40/279
See application file for complete search history.

(56) References Cited

U.S. PATENT DOCUMENTS

2009/0226046 A1\* 9/2009 Shteyn .................... G06F 17/00

OTHER PUBLICATIONS

Dvornik, Nikita, et al. "Drop-DTW: Aligning Common Signal Between Sequences While Dropping Outliers." Advances in Neural Information Processing Systems 35 (2021): 13782-13793.

\* cited by examiner

*Primary Examiner* — Anthony Bantamoi
(74) *Attorney, Agent, or Firm* — Athorus, PLLC

(57) ABSTRACT

Visual content of media programs is recognized using text-based scripts of the media programs. A script of a media program includes sets of words to be spoken by actors during the media program, and also descriptions of points of interest of the media program. A file of subtitles or captions of a media program includes sets of words actually spoken by actors during the media program along with marks or stamps of times when such words were spoken. The sets of words of a script and in subtitles or captions are processed to determine where such words align. The sets of words of the script are then marked or stamped with times from the subtitles. The descriptions may then be processed to predict the visual content from such descriptions, and times at which the visual content appears within the media program are determined from the sets of words.

20 Claims, 12 Drawing Sheets

MEDIA PROGRAM AND SUBTITLES

PORTIONS OF SCRIPT ALIGNED WITH TIME-STAMPED SUBTITLES

PORTIONS OF SCRIPT ALIGNED WITH TIME-STAMPED SUBTITLES

MATCHING AND NON-MATCHING OUTPUTS FROM ALIGNMENT ALGORITHM

DETERMINING VISUAL CONTENT OF MEDIA PROGRAMS FROM SCRIPTS

BACKGROUND

Determining visual content of media programs that are presented to viewers of the media program is an important task for many reasons, regardless of the format by which the media programs are presented to the viewers. For example, in some jurisdictions, specific media content may be barred or otherwise restricted from presentation to viewers, based on ages of the viewers, times of day at which the media content is to be presented, or channels or other means by which the media content is to be presented, such as whether the media content is presented "over the air" or via a subscription service. Additionally, many media programs are rated for content according to one or more ratings standards. Therefore, understanding what is visually presented within a media program is critical to selecting an appropriate rating for the media program, or determining whether the media program complies with an assigned rating. Moreover, where a media program is to be modified to remove specific media content, such as to ensure that the modified media program complies with a lower or less restrictive rating, portions of the media program depicting the specific media content must be determined to ensure that only the specific media content is removed, and that the balance of the media program remains intact.

In many instances, determining visual content of a media program may be performed by one or more object detection or other vision-based algorithms, systems or techniques. For example, where a rating or a regulation relates to the presentation of media content relating to drugs, firearms or nudity, an object detection algorithm, system or technique may be trained to recognize specific narcotics, guns or parts of the human body, and used to determine whether images of a media program depict any of such narcotics, guns or body parts.

Object detection or other vision-based algorithms, systems or techniques are often computationally expensive, however. Because many media programs are recorded at image frame rates of thirty to sixty frames per second, an object detection or vision-based algorithm, system or technique must be performed on many thousands of images in order to confirm that a media program is free of predetermined or offending visual content: for example, a thirty-minute media program recorded at thirty frames per second includes 54,000 image frames, while a two-hour media program recorded at sixty frames per second includes 432,000 image frames. Moreover, if designated or offending visual content is presented in a manner that is masked or partially obscured, or has not been seen before, the visual content may escape recognition by many such algorithms, systems or techniques.

DETAILED DESCRIPTION

Figure 1A:
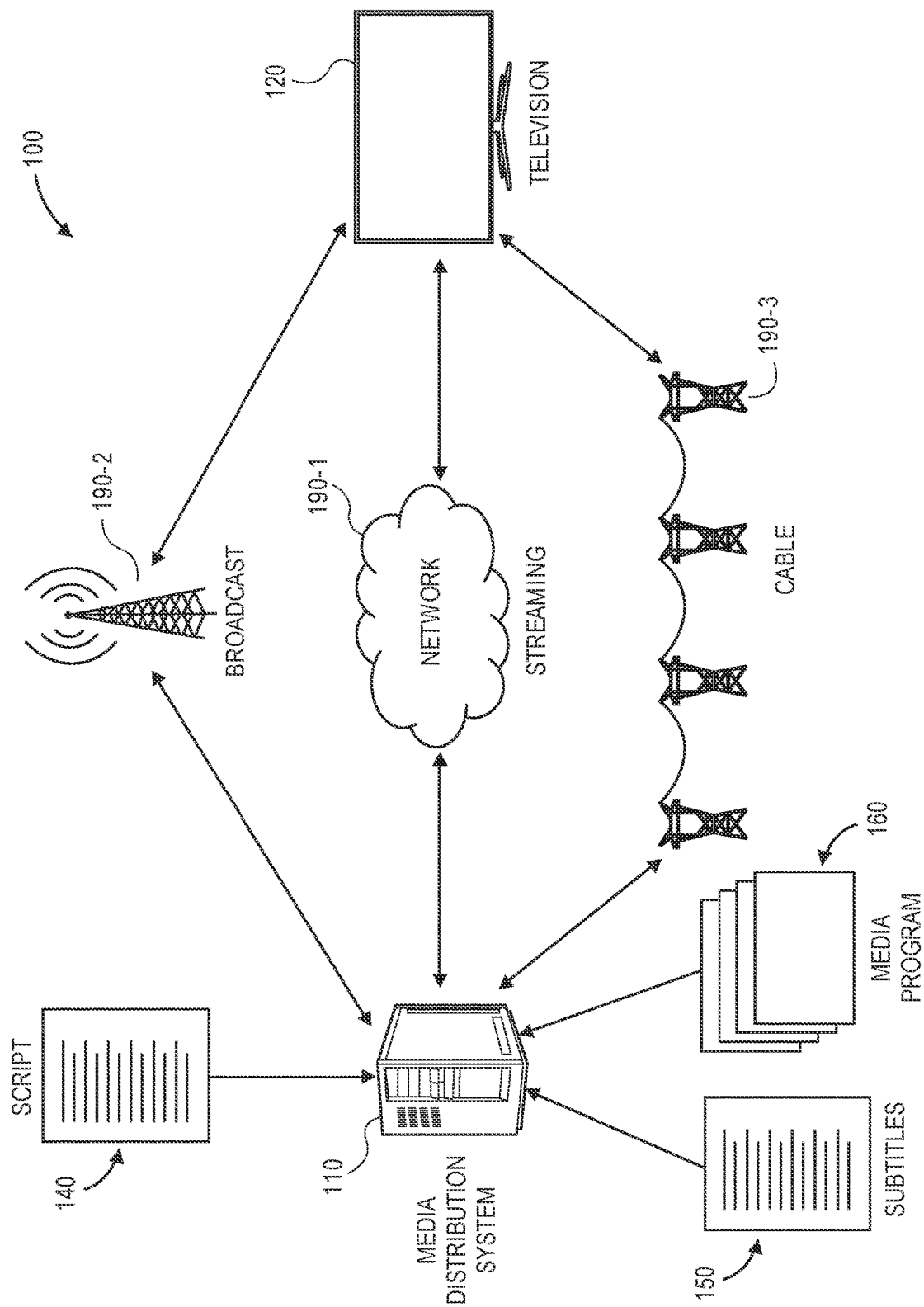
FIGS. 1A through 1G are views of aspects of one system for determining visual content of media programs in accordance with implementations of the present disclosure.

As is set forth in greater detail below, the present disclosure is directed to systems and methods for determining visual content of media programs. More specifically, where a production script (or screenplay) of a media program includes sets of words to be uttered by actors during the media program (or monologues, dialogues or other sequences or conversations), as well as descriptions of actions or events descriptions of actions, settings, characters or production directions or instructions for the media program, the script may be parsed to identify the sets of words to be uttered by the actors and the descriptions. Where a set of subtitles (or captions) for the media program is marked or stamped with times at which sets of words are actually uttered by actors during the media program, the sets of words that were intended to be uttered by the actors according to the script may be compared to the sets of words that were actually uttered by the actors according to the sets of words of the subtitles. When matches are identified between sets of words of a script and corresponding sets of words from the time-stamped subtitles, time stamps from the subtitles may be associated with the sets of words of the script.

Once the sets of words of the script have been associated with time stamps, descriptions of the media program set forth in the script that are located in proximity to such sets of words, e.g., which precede or follow such sets of words, may be associated with portions of the media program, which may be identified based on the time stamps. The descriptions may be processed according to any number of algorithms, systems or techniques, e.g., word searching, natural language processing (or "NLP") or natural language understanding (or "NLU") algorithms, to identify any references to visual content that are expressed therein, and such descriptions may be associated with portions of the media program accordingly.

Where visual content of a media program is identified as being subject to regulation or moderation based on the descriptions set forth in the script, which may reference age-restricted themes (e.g., adult themes), violence, sexually oriented nudity, use or abuse of alcohol, tobacco or other drugs, or others, any number of actions may be undertaken. For example, the media program may be assigned a rating associated with a classification of the visual content, presented to viewers at times, on days or via channels that are appropriate for the visual content, or modified to diminish or remove the existence or prevalence of the visual content, as necessary. In some implementations, the visual content of portions of the media program identified as being subject to regulation or moderation based on the descriptions set forth in the script may be reviewed or evaluated by one or more human operators, e.g., to validate a determination as to visual content of the media program, or to more precisely identify the portions of the media program having the visual content.

Therefore, the systems and methods of the present disclosure may be used to determine visual content of a media program based on text-based descriptions of the media program, including but not limited to scripts and sets of subtitles or captions, in an efficient manner that may replace or complement the use of object detection or vision-based algorithms, systems or techniques, or augment or enhance reviews of media programs by humans.

Referring to FIGS. 1A through 1G, views of aspects of one system for determining visual content of media programs in accordance with implementations of the present disclosure are shown. As is shown in FIG. 1A, the system includes a media distribution system 110 and a television 120 that may be connected to one another over a plurality of communications networks 190-1, 190-2, 190-3, including but not limited to a computer network 190-1 that may include the Internet in whole or in part, a broadcast television network 190-2 or a cable television network 190-3, as well as any other types or forms of communications networks (not shown), such as a cellular telephone network. The media distribution system 110 may be any source of media programs including audio signals, visual content and/or associated information, data or metadata, or a system from which streams of such video files are made available to viewers over one or more of the networks 190-1, 190-2, 190-3. For example, the media distribution system 110 may be an online marketplace, an entertainment company, a video streaming service (e.g., a free service or a pay service), a cable television provider, an operator of an over-the-air television channel, a social network, an outlet for news or media of any kind, or any like individual or entity. The television 120 may be any system that is configured to display video content, and, optionally, air one or more accompanying audio signals. Alternatively, the television 120 may be one or more components of a computer system or device, e.g., a smartphone, a tablet computer, a laptop computer, or any other system or device having one or more processors and a display.

The media distribution system 110 may be any source or recipient of media content, e.g., still or moving images, audio content or other multimedia, by way of a networked computer infrastructure. The media distribution system 110 may include one or more physical computer servers or data stores (e.g., databases) for hosting a network site (or network sites), or for transmitting images or other video content, audio content or other multimedia to devices or systems of users. For example, the media distribution system 110 may be any individual or entity associated with the broadcasting, airing, streaming or distribution of one or more video and audio files over networks, which may include the Internet in whole or in part, such as an online marketplace, an entertainment company, a video streaming service, a cable television provider, an operator of an over-the-air television station or channel, a social network, an outlet for news or media of any kind, or any like individual or entity.

As is shown in FIG. 1A, the media distribution system 110 may have access to one or more sets of data representing scripts 140, one or more sets of data representing subtitles 150, and one or more media programs 160. Each of the scripts 140 may be any type or form of written work, such as a screenplay or a teleplay, that includes, in written form, words to be spoken by one or more actors (e.g., monologues, dialogues or other sequences or conversations) during a media program, as well as descriptions of actions, settings, characters or production directions or instructions for a movie, a television show, or any other media program.

Each of the subtitles (or captions) 150 may include sets of words that are spoken during one of the media programs 160, along with markings or stampings of times, e.g., time stamps, associated with each of such sets of words. The subtitles 150 may be stored in one or more data files, such as Video Text Track files (or .VTT files), Distribution Format Exchange Profile (DFXP), Timed Text Markup Language (TTML), or SubRip Subtitle files (or .SRT files) that may contain the sets of words spoken during the media programs 160 along with times or time codes associated with each of the subtitles, along with numbers of the respective subtitles, indicators of text formatting such as fonts, styles or colors, or any other metadata. For example, the subtitles 150 may include not only sets of words but time stamps identifying times during one of the media programs 160 when such sets of words were uttered by one or more actors, e.g., a single time stamp identifying one time, or a pair of time stamps bounding an utterance of a set of words, e.g., an initial time stamp and a final time stamp.

Each of the media programs 160 may be a film, a movie, a television program or any other media program of any length or duration having visual images and audio signals, in any format. In some implementations, the media programs 160 may have been previously recorded prior to being presented to viewers over the networks 190-1, 190-2, 190-3 or in any other manner. In some other implementations, the media programs 160 may have been recorded live and aired subject to an intentional delay, e.g., deferred live, as the subtitles 150 for the media programs are generated.

In accordance with implementations of the present disclosure, a file or a set of data representing a script may include monologues, dialogues or other sequences or conversations featuring sets of words (or "lines") that are to be spoken by actors in a media program, as well as text-based descriptions of actions or occurrences during the media program. Also in accordance with implementations of the present disclosure, a file or a set of data representing subtitles or captions may include not only sets of words spoken by actors in a media program but also marks or stamps of times, e.g., time stamps, at which such words were spoken.

Figure 1B:
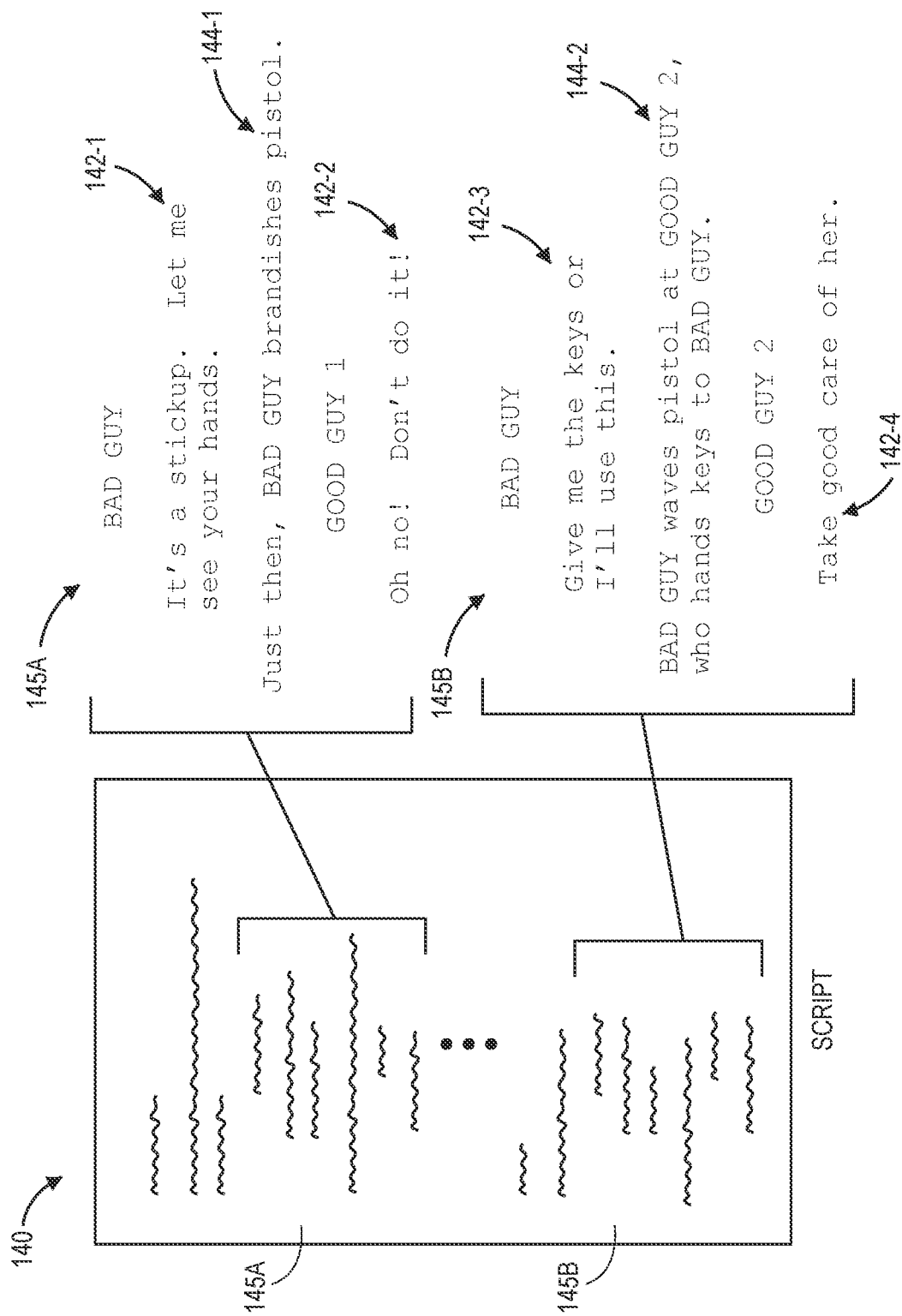

As is shown in FIG. 1B, the script 140 includes sets of words to be spoken by one or more actors (e.g., monologues, dialogues or other sequences or conversations), as well as descriptions of settings, characters or production directions or instructions. For example, as is shown in FIG. 1B, one portion 145A of the script 140 includes a set of words 142-1 that are intended to be spoken by one actor, viz., "BAD GUY," followed by a description 144-1 of the portion 145A, and a set of words 142-2 that are intended to be spoken by another actor, viz., "GOOD GUY 1." The set of words 142-1 intended to be spoken by the actor "BAD GUY" include, "It's a stickup. Let me see your hands." The description 144-1 indicates that, as or after speaking the set of words 142-1, "[j]ust then, BAD GUY brandishes a pistol." The set of words 142-2 intended to be spoken by the actor "GOOD GUY 1" include, "Oh no! Don't do it!"

Similarly, as is also shown in FIG. 1B, another portion 145B of the script 140 includes a set of words 142-3 that are intended to be spoken by the actor "BAD GUY," a description 144-2 of the portion 145B, and a set of words 142-4 that are intended to be spoken by another actor "GOOD GUY 2." In particular, the set of words 142-3 intended to be spoken by the actor "BAD GUY" include, "Give me the keys or I'll use this." The description 144-2 indicates that, as or after speaking the set of words 142-3, "BAD GUY waves pistol at GOOD GUY 2, who hands keys to BAD GUY." The set of words 142-4 intended to be spoken by "GOOD GUY 2" include, "Take good care of her."

Figure 1C:
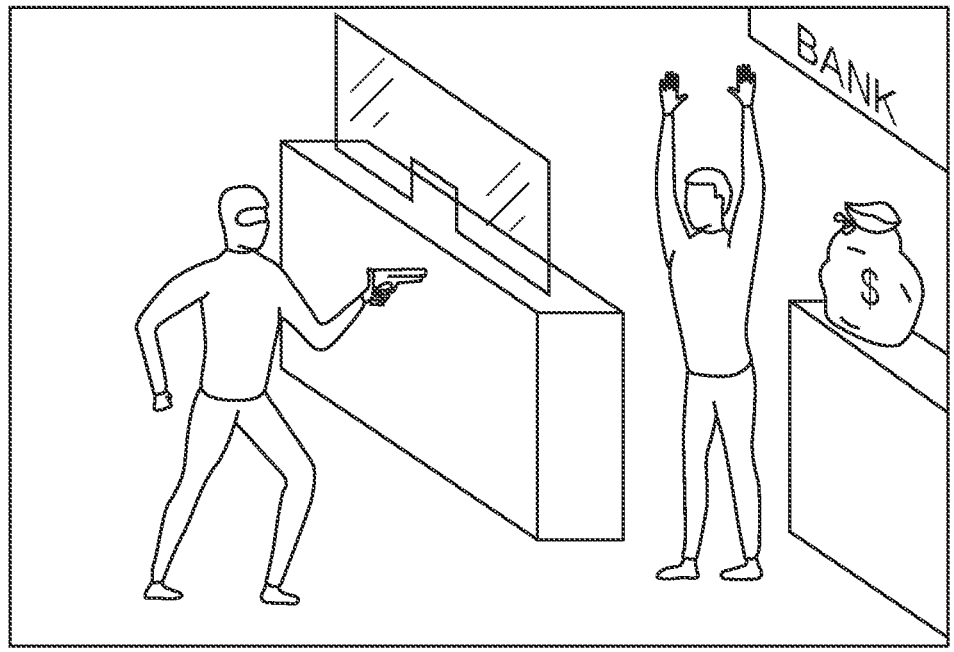

As is shown in FIG. 1C, during one scene 165A of the media program 160, the subtitles 150 include one set of words (e.g., a subtitle or caption) 152-1 of "This is a stickup.

Show me your hands," bearing a time stamp 154-1 of time $t_1$ and a time stamp 154-2 of time $t_2$, thereby indicating that the set of words 152-1 were uttered between the time $t_1$ and the time $t_2$ of the media program 160. Also during the scene 165A, the subtitles 150 further include a set of words 152-2 of "No! Please don't do it!" bearing a time stamp 154-3 of time $t_3$ and a time stamp 154-4 of time $t_4$, thereby indicating that the set of words 152-2 were uttered between the time $t_3$ and the time $t_4$ of the media program 160.

Figure 1D:
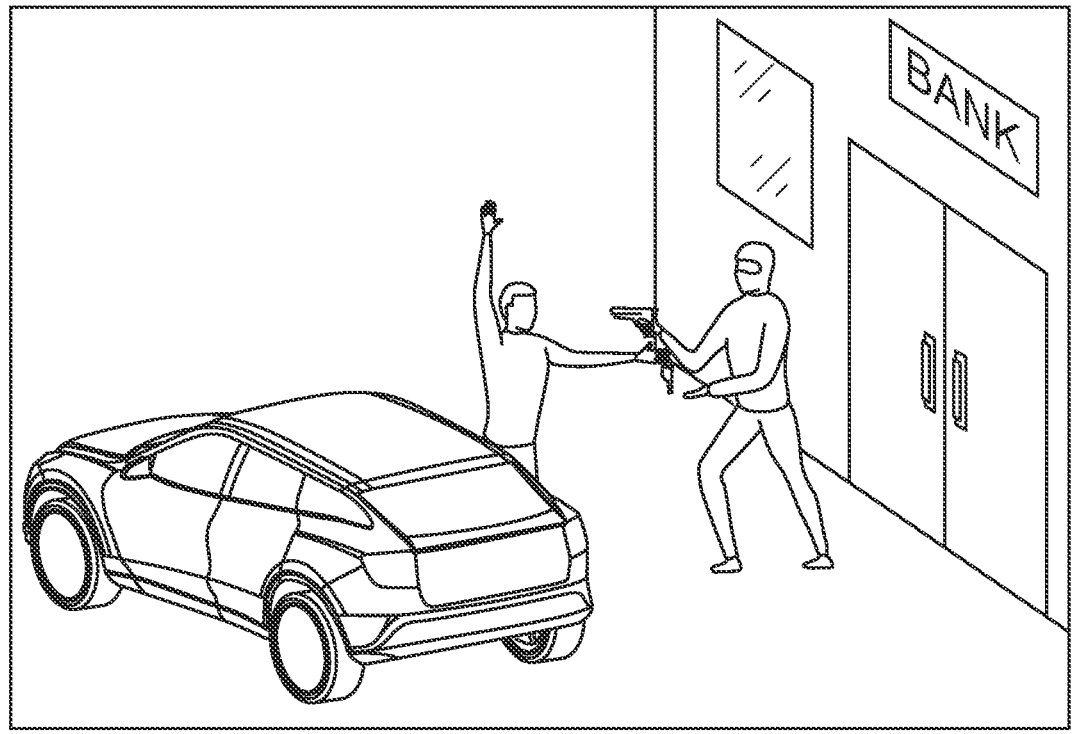

Similarly, is shown in FIG. 1D, during another scene 165B of the media program 160, the subtitles 150 include one set of words 152-3 of "The keys, now! Or else," bearing a time stamp 154-5 of time $t_5$ and a time stamp 154-6 of time $t_6$, thereby indicating that the set of words 152-3 were spoken between the time $t_5$ and the time $t_6$ of the media program 160. Also during the scene 165B, the subtitles 150 further include a set of words 152-4 of "Please take good care of my baby," bearing a time stamp 154-7 of time $t_7$ and a time stamp 154-8 of time $t_8$, thereby indicating that the set of words 152-4 were uttered between the time $t_7$ and the time $t_8$ of the media program 160.

Figure 1E:
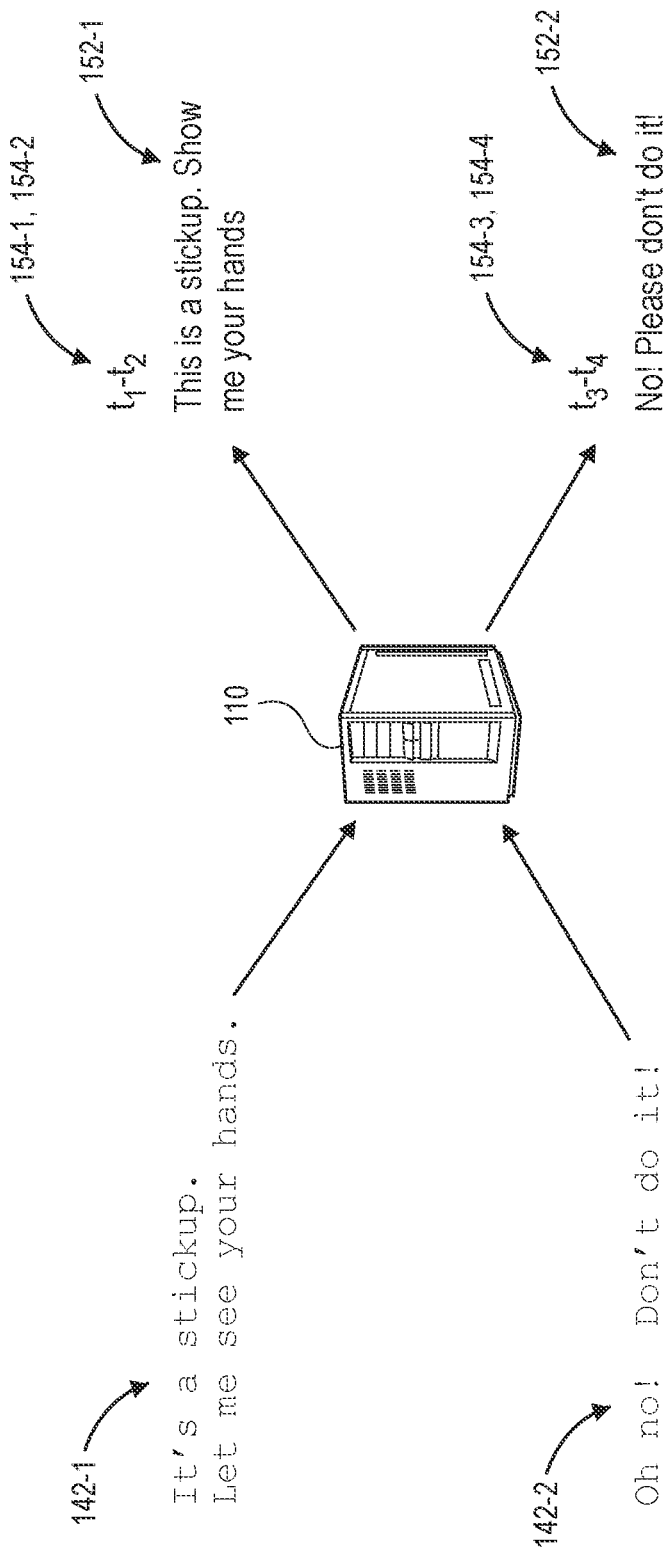
Figure 1F:
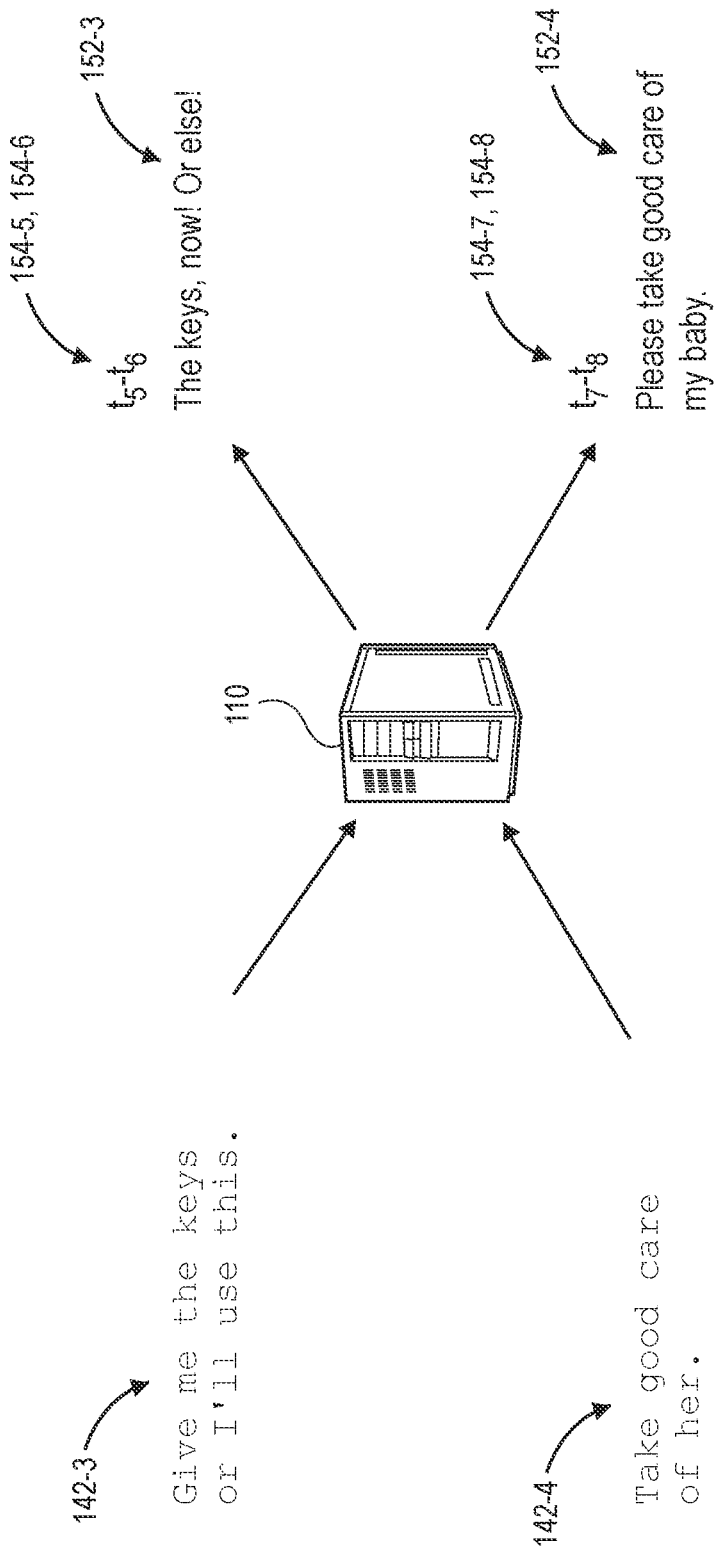

In accordance with implementations of the present disclosure, portions of the script 140 may be aligned with portions of the subtitles 150, in order to determine whether any of the monologues, dialogues or other sequences or conversations included in the script 140, e.g., words intended to be spoken by actors during the media program 160, match or are otherwise sufficiently consistent with any of the subtitles 150. For example, as is shown in FIG. 1E, the media distribution system 110 (or any other computer device or system) may execute one or more alignment algorithms (or systems or techniques) on portions of the script 140 and portions of the subtitles 150, and determines that the set of words 142-1 corresponds to the set of words 152-1, and that the set of words 142-2 corresponds to the set of words 152-2. Similarly, as is shown in FIG. 1F, the media distribution system 110 further executes one or more alignment algorithms on portions of the script 140 and portions of the subtitles 150, and determines that the set of words 142-3 corresponds to the set of words 152-3, and that the set of words 142-4 corresponds to the set of words 152-4.

In some implementations, the media distribution system 110 may identify portions of the script 140 that align with portions of the subtitles 150 by tokenizing each of the sets of words 142-1, 142-2, 142-3, 142-4 of the script 140, and the sets of words 152-1, 152-2, 152-3, 152-4 of the subtitles 150, and generating feature vectors based on the tokenized sets of words. The media distribution system 110 may then provide the sets of words 142-1, 142-2, 142-3, 142-4 of the script 140 and the sets of words 152-1, 152-2, 152-3, 152-4 of the subtitles 150 as inputs to a dynamic time warping algorithm or another alignment algorithm to determine whether any of the feature vectors generated based on the sets of words 142-1, 142-2, 142-3, 142-4 of the script 140 align with any of the feature vectors generated based on the sets of words 152-1, 152-2, 152-3, 152-4 of the subtitles 150, based on outputs of the alignment algorithm, which may identify matching sets of words of the script 140 and the subtitles 150, as well as sets of words of the script 140 that do not match with any sets of words of the subtitles 150, or vice versa.

Discrepancies between sets of words of the script 140 and sets of words of the subtitles 150 may exist for any reason. For example, where an actor is expected to read lines from the script 140, but deviates slightly from the script 140 by mistake or intentionally, or ad libs, a small or insignificant discrepancy may be detected between sets of words of the script 140 and sets of words of the subtitles 150. Where changes are made to the media program 160 after the script 140 is written but before the media program 160 is recorded, discrepancies may necessarily exist between the script 140 and the subtitles 150. Where the media program 160 is recorded all actors speaking lines according to the script 140, but producers add, remove or rearrange scenes of the media program 160, discrepancies may likewise exist between the script 140 and the subtitles 150. Regardless of a reason or cause, sets of words of the script 140 and sets of words of the subtitles 150 may be determined to be aligned where there are no discrepancies between such sets of words, or where any such discrepancies are small or insignificant. Where discrepancies between sets of words of the script 140 and sets of words of the subtitles 150 are substantial, however, the sets of words of the script 140 are not present within the media program 160, and the descriptions of the script 140 may not be relied upon as accurately describing such portions of the media program 160.

Once sets of words of the script 140 have been aligned with sets of words of the subtitles 150, the time stamps associated with the sets of words of the subtitles 150 may be applied to the corresponding sets of words of the script 140. For example, as is shown in FIG. 1E, because the set of words 142-1 of the script 140 has been aligned with the set of words 152-1 of the subtitles 150, the time stamps 154-1, 154-2 associated with the set of words 152-1 may likewise be associated with the set of words 142-1. Similarly, as is also shown in FIG. 1E, because the set of words 142-2 of the script 140 has been aligned with the set of words 152-2 of the subtitles 150, the time stamps 154-3, 154-4 associated with the set of words 152-2 may likewise be associated with the set of words 142-2.

As is shown in FIG. 1F, because the sets of words 142-3, 142-4 of the script 140 have been aligned with the sets of words 152-3, 152-4 of the subtitles, the time stamps 154-5, 154-6 associated with the set of words 152-3 of the subtitles 150 may be associated with the set of words 142-3 of the script 140, and the time stamps 154-7, 154-8 associated with the set of words 152-4 of the subtitles 150 may be associated with the set of words 142-4 of the script 140.

Figure 1G:
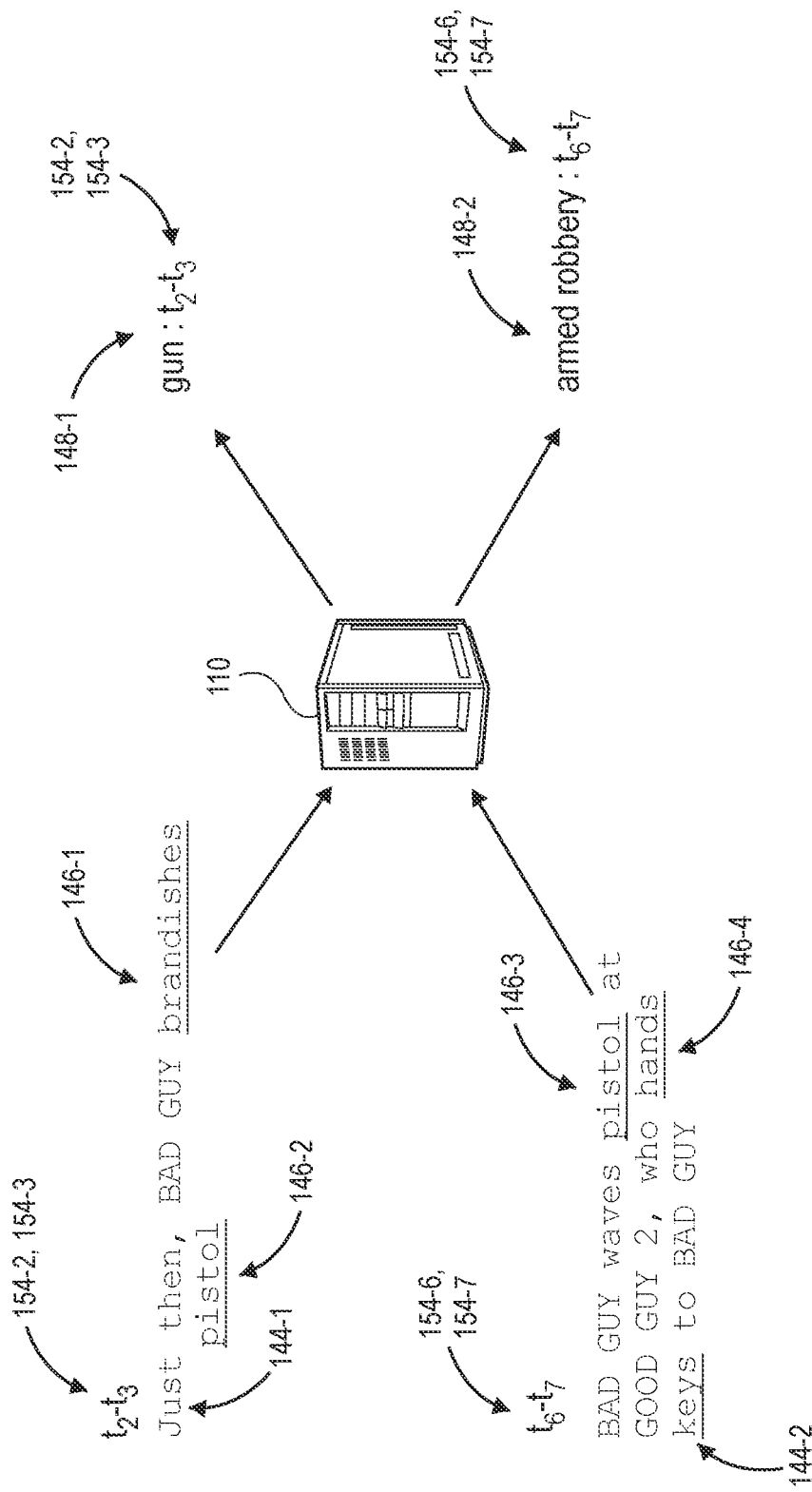

Once time stamps associated with sets of words of the subtitles 150 have been associated with sets of words of the script 140, such time stamps may be further associated with descriptions of the script 140, and to identify portions of the media program 160 corresponding to such descriptions. As is shown in FIG. 1G, the description 144-1 of the script 140 may be associated with a portion of the media program 160 occurring between the times $t_2$, $t_3$ associated with the time stamps 154-2, 154-3. As is further shown in FIG. 1G, the description 144-2 of the script 140 may be associated with a portion of the media program 160 occurring between the times $t_6$, $t_7$ associated with the time stamps 154-6, 154-7.

Moreover, where descriptions of the script 140 are processed to determine whether such descriptions contain or reference any aspects of visual content of interest that is or may be subject to regulation or moderation, e.g., images depicting age-restricted themes, violence, sexually oriented nudity, use or abuse of alcohol, tobacco or other drugs, or others. For example, as is also shown in FIG. 1G, the description 144-1 may processed to identify terms 146-1, 146-2 of "brandishes" and "pistol," and determine that content 148-1 of "gun" is depicted between the times $t_2$, $t_3$ associated with the time stamps 154-2, 154-3, while the description 144-2 may be processed to identify terms 146-3, 146-4 of "pistol" and "hands keys," and determine that content 148-2 of "armed robbery" is depicted between the times $t_6$, $t_7$ associated with the time stamps 154-6, 154-7. The descriptions 144-1, 144-2 may be subject to word searching, natural language processing (or "NLP") or natural language understanding (or "NLU") algorithms, systems or techniques, or in any other manner, to identify the terms 146-1, 146-2, 146-3, 146-4, or to associate such terms with the content 148-1, 148-2, viz., "gun" and "armed robbery," respectively. Where the descriptions 144-1, 144-2 are processed according to a word searching, NLP or NLU algorithm, system or technique, an output received from the algorithm, the system or the technique may indicate whether the descriptions 144-1, 144-2 depict visual content in a binary manner, e.g., that a description does or does not depict predetermined content, or whether the descriptions 144-1, 144-2 depict visual content to a degree of confidence, such as according to a confidence score or interval.

In some implementations, the time stamps 154-2, 154-3, 154-7, 154-8 that are associated with the descriptions 144-1, 144-2 of the script 140 may expressly delineate portions of the media program 160 that correspond to such descriptions, e.g., between the times $t_2$, $t_3$ and between the times $t_6$, $t_7$, as shown in FIG. 1G. In some other implementations, however, the time stamps may merely inform as to the portions of the media program 160 corresponding to such descriptions, however. For example, where the time stamps 154-2, 154-3, 154-7, 154-8 are associated with the media program 160, a buffer of a predetermined period of time, e.g., ten seconds, may be added to each of the times associated with such stamps 154-2, 154-3, 154-7, 154-8, and portions of the media program 160 that are located between the buffered times, e.g., ten seconds prior to the time $t_2$ and ten seconds beyond the time $t_3$, or ten seconds prior to the time $t_6$ and ten seconds beyond the time $t_7$, may be determined to be associated with such descriptions. Moreover, where the time stamps 154-2, 154-3, 154-7, 154-8 are associated with the media program 160, portions of the media program 160 that are located between the times associated with such stamps, or between buffered times, may be provided to a human operator for review. The human operator may then specifically identify the portions of the media program 160 that correspond to the descriptions, or determine that no portion of the media program 160 corresponds to any of the descriptions.

One or more of the functions, applications or processes described above as being performed by the media distribution system 110 or elsewhere herein as being performed by a single computer device or system may be performed by two or more computer devices or systems. For example, in some implementations, one computer system may parse, tokenize and vectorize scripts or subtitles, and determine whether portions of the scripts correspond in time to portions of the subtitles, while another computer system may distribute media programs including visual images and audio signals to devices of viewers, such as the television 120.

Figure 2:
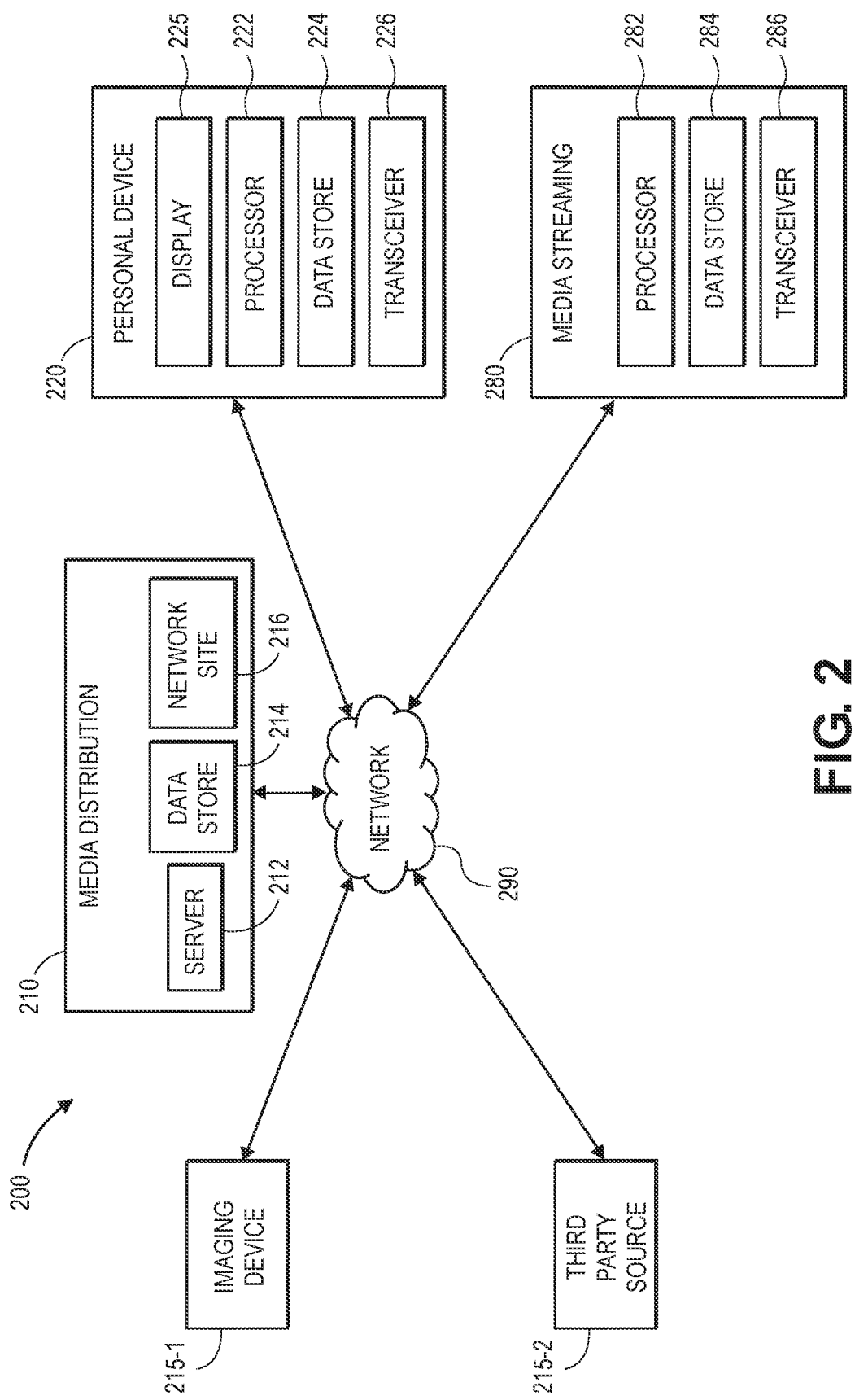
FIG. 2 is a block diagram of components of one system for determining visual content of media programs in accordance with implementations of the present disclosure.

Referring to FIG. 2, a block diagram of components of one system 200 for determining visual content of media programs in accordance with implementations of the present disclosure is shown. Except where otherwise noted, reference numerals preceded by the number "2" shown in FIG. 2 indicate components or features that are similar to components or features having reference numerals preceded by the number "1" shown in FIGS. 1A through 1G.

As is shown in FIG. 2, the system 200 includes a media distribution system 210, one or more imaging devices 215-1 (e.g., cameras), one or more third party sources 215-2 of media, one or more personal devices 220 and one or more media streaming devices 280 that may be connected to one another over one or more networks 290.

The media distribution system 210 may be any device, component or system for receiving and distributing digital media, e.g., still or moving images or other video content, audio content or other multimedia, by way of a networked computer infrastructure including one or more physical computer servers 212 and data stores 214 (e.g., databases) for hosting a network site 216 (or network sites). For example, the media distribution system 210 may be any individual or entity associated with the broadcasting, airing, streaming or distribution of one or more video files received from any number of imaging devices 215-1 or third party sources 215-2 over the networks 290, such as an online marketplace, an entertainment company, a video streaming service, a cable television provider, an operator of an over-the-air television station or channel, a social network, an outlet for news or media of any kind, or any like individual or entity.

The media distribution system 210 may also be provided in connection with one or more physical or virtual services configured to manage or monitor digital media, as well as one or more other functions. The servers 212 may be connected to or otherwise communicate with the data stores 214 and may include one or more processors. The data stores 214 may store any type of information or data, including digital media files or any like files containing multimedia (e.g., audio and/or video content), for any purpose. The servers 212 and/or the data stores 214 may also connect to or otherwise communicate with the networks 290, through the sending and receiving of digital data.

In some implementations, the media distribution system 210 may be an Internet-based streaming content and/or media service provider. For example, the media distribution system 210 may be configured to distribute media (e.g., audio and/or video content) over the network 290 to one or more general purpose computers or computers that are dedicated to a specific purpose. The media distribution system 210 may also be configured to transmit content via a direct broadcast system, or to one or more specifically configured components such as televisions, set-top boxes or like units or components (e.g., cable boxes or converters).

For example, in some implementations, the media distribution system 210 may be associated with a television channel, network or provider of content of any type or form that is configured to transmit video files over the airwaves, via wired cable television systems, by satellite, over the Internet, or in any other manner. In some implementations, the media distribution system 210 may also be associated with any streaming video source that streams one or more video files for free or for a one-time or recurring fees. In some implementations, the media distribution system 210 may be associated with any type or form of network site (e.g., a web site), including but not limited to news sites, sports sites, cultural sites, social networks or other sites, that streams one or more video files over a network. In essence, the media distribution system 210 may be any individual or entity that makes content (e.g., audio and/or video files) of any type or form available to any other individuals or entities over one or more networks 290.

The media distribution system 210 of FIG. 2 may be independently provided for the exclusive purpose of managing the monitoring and distribution of video files or other information or data captured by the imaging device 215-1 or received from the third party source 215-2, such as visual imaging data and/or accompanying audio signals and metadata. Alternatively, the media distribution system 210 may be operated in connection with one or more physical or virtual services configured to manage the monitoring or distribution of such files, as well as one or more other functions. The servers 212 may be connected to or otherwise communicate with the data stores 214 and may include one or more processors, circuits or other like systems or components. The data stores 214 may store any type of information or data, including digital media files or any like files containing multimedia (e.g., audio and/or video content), for any purpose. The network sites 216 may be provided for any purpose in association with the media distribution system 210, including but not limited to the marketing of one or more video files, receiving and granting authentication requests (e.g., log-in names and/or passwords), or any other purpose. The servers 212 and/or the computer processors may also connect to or otherwise communicate with the networks 290, through the sending and receiving of digital data.

The imaging device 215-1 may comprise any form of optical recording sensor or device that may be used to photograph or otherwise record information or data regarding activities occurring within one or more areas or regions of a given environment, e.g., a scene or a setting, or for any other purpose. The media distribution system 210 may be associated with any number of the imaging devices 215-1, each of which may include any number of sensors, memory or storage components (e.g., a database or another data store), processors and any other components that may be required in order to capture, analyze and/or store imaging data or accompanying audio signals captured from within static or variable environments in which an imaging device 215-1 is provided. For example, one or more imaging devices 215-1 may capture one or more still or moving images, along with any relevant audio signals or other information, and may also connect to or otherwise communicate with one another, or with the networks 290.

The third party source 215-2 may be any source of media, such as a linear channel, a television station or network, a cable television provider, a streaming service, or others. Media that is received from the third party source 215-2 may have been captured live by one or more cameras or other imaging devices of the third party source 215-2, or otherwise obtained in any other manner, such as by purchasing or renting rights to air the media, e.g., by way of the media distribution system 210 or in any other manner, such as files over the airwaves, via wired cable television systems, by satellite, or in any other manner.

In addition to the imaging device 215-1 or the third party source 215-2, the media distribution system 210 may include any type or form of systems or components for receiving video files and associated audio signals or metadata, e.g., over the networks 290. For example, the media distribution system 210 may receive one or more video files via any wired or wireless means and store such video files in the one or more data stores 214 for subsequent processing, analysis and distribution. In some implementations, the media distribution system 210 may process and/or analyze video files captured by the imaging device 215-1, or received over the networks 290 from the third party source 215-2, according to one or more detection or recognition algorithms or techniques, in order to detect or recognize one or more attributes of the visual content expressed therein, or of the audio signals accompanying such visual content. In some implementations, the media distribution system 210 may be further configured to add or assign metadata, e.g., one or more tags or virtual markings, to video files. Such metadata may indicate times or points within a video file where one or more specific products or categories of products is depicted or referenced therein, or include one or more identifiers of such products or categories. The media distribution system 210 may generate any type or form of record associated with the visual content of a video file, or the audio signals accompanying the video file, and may store such records in association with a corresponding video file or separately, e.g., in a structured form. Such records may be made available to other entities, such as the personal device 220 and/or the media streaming device 280 e.g., over the networks 290.

Additionally, the media distribution system 210 may be further configured to edit, crop, alter, modify or adjust one or more attributes of a video file. For example, where a video file is captured by the imaging device 215-1, or received from the third party source 215-2, e.g., over the networks 290, one or more single images, or streams of images, may be captured or otherwise obtained from the video file, and transmitted to the personal device 220 and/or the media streaming device 280. The media distribution system 210 may also be configured to compare and contrast visual content and/or audio signals or metadata regarding two or more video files, and to make any number of determinations regarding the similarity or differences between such video files, audio signals or metadata. For example, the media distribution system 210 may be configured to identify attributes of one or more video frames of a video file, such as information or data regarding edges, contours, outlines, colors, textures, silhouettes, shapes or other characteristics of objects or portions thereof expressed in such video frames, e.g., according to one or more detection or recognition algorithms or techniques, and to compare such attributes to attributes of other video frames of other video files. The media distribution system 210 may also be configured to calculate one or more scores indicative of similarities or differences between such frames or such files. The media distribution system 210 may also be configured to engage in communications of any type or form with the personal device 220 and/or the media streaming device 280.

The media distribution system 210 may further broadcast, air, stream or otherwise distribute video files maintained in the data stores 214 to one or more users, via the personal devices 220 and/or the media streaming devices 280, over the networks 290. Accordingly, in addition to the server 212, the data stores 214, and the network sites 216, the media distribution system 210 may also include any number of components associated with the broadcasting, airing, streaming or distribution of such files, including but not limited to transmitters, receivers, antennas, cabling, satellites, or communications systems of any type or form. Processes for broadcasting, airing, streaming and distribution of video files over various networks are well known to those skilled in the art of communications and thus, need not be described in more detail herein.

For example, in some implementations, the media distribution system 210 may also receive or access one or more records of information, data or metadata regarding preferences of a given user, or of users similarly situated to the user or otherwise having one or more attributes in common with the user, as well as any information, data or metadata regarding one or more contexts or events, instances or occurrences of particular relevance in association with a specific time or location. Based on such information, data or metadata, the media distribution system 210 may identify media content (e.g., audio and/or video content) to be presented to a user in association with one or more applications or content sources, including but not limited to media content to be promoted to the user, or contextual or supplemental content to be displayed to the user in association with the applications or content sources. The media distribution system 210 may further generate media files including such content, or modify one or more existing media files to include such content, and transfer such video files to the personal device 220 or the media streaming device 280 over the networks 290 or by any other means. Additionally, the media distribution system 210 may further engage in communications of any type or form with the personal devices 220 and/or the media streaming devices 280.

The personal device 220 may be any peripheral output device capable of receiving and displaying or otherwise outputting any content. The personal device 220 may be associated with any user (e.g., an individual or entity), and may be a general purpose or a special purpose device for viewing content and/or communicating with other computer devices over the networks 290. For example, the personal device 220 may be a television of any type or form, as well as any type of networked computer device (e.g., a personal digital assistant, a digital media player, a smartphone, a web pad, an electronic book reader, a desktop computer, a laptop computer or a tablet computer, as well as a wearable computer device such as a pair of augmented reality glasses or a wristwatch, or a computer device that may be incorporated into one or more vehicles or appliances) or any other like machine that may operate or access one or more software applications, or communicate with the media streaming device 280, and may be configured to render content on one or more displays or to interact with such content.

The personal device 220 may include a display (or screen) 225, a processor 222, a data store 224 and/or a transceiver 226. The display 225 may be a television system, a monitor or any other like machine having a screen for viewing rendered video content. For example, the display 225 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 225 may be configured to receive content from any number of sources via one or more wired or wireless connections, including but not limited to the media distribution system 210 or the media streaming devices 280 over the networks 290.

The processor 222 may be configured to perform any type or form of computing function associated with the operation of the personal device 220, including but not limited to the execution of one or more machine learning tools, algorithms or techniques. The processor 222 may also be configured to execute any other algorithms or techniques (e.g., object detection or recognition algorithms or techniques) associated with one or more applications, purposes or functions, and may communicate with the media distribution system 210, the media streaming system 280, or any other external computing devices or machines over the network, through the sending and receiving of digital data.

The processor 222 may be a uniprocessor system including one processor, or a multiprocessor system including several processors (e.g., two, four, eight, or another suitable number), and may be capable of executing instructions. For example, in some implementations, the processor 222 may be a general-purpose or embedded processor unit such as a CPU or a GPU having any number of instruction set architectures (ISAs), such as the x86, PowerPC, SPARC, or MIPS ISAs, or any other suitable ISA. Where the processor 222 is a multiprocessor system, each of the processors within the multiprocessor system may operate the same ISA, or different ISAs. The processors 222 may be configured to operate one or more software applications, e.g., a browser, a viewing application operating one or more codecs, a shopping application, and render content to the display 225 via one or more user interfaces. The processor 222 may execute one or more computer-based instructions that may be stored on the data store 224, along with one or more video files or operating programs or instructions.

The personal device 220 further includes one or more data stores (e.g., memory or storage components) 224 for storing any type of information or data, e.g., content received over the network 290, or any associated information, data or metadata. The personal device 220 also includes the transceiver 226, which may be configured to enable the personal device 220 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly.

The transceivers 226 may be configured to communicate over one or more of the networks 290, such as by receiving and interpreting broadcast signals, cable television signals, computer signals, cellular telephone signals or any other type or form of signals, and responding in kind with any number of corresponding or reciprocal signals. The transceiver 226 may further include or be in communication with one or more input/output (or "I/O") interfaces, network interfaces and/or input/output devices, and may be configured to allow information or data to be exchanged between one or more of the components of the personal device 220, or to one or more other computer devices or systems (e.g., other aerial vehicles, not shown) via the network 290. For example, in some implementations, the transceiver 226 may be configured to coordinate I/O traffic between the processor 222 and one or more external computer devices or components, and may perform any necessary protocol, timing or other data transformations in order to convert data signals from a first format suitable for use by one component into a second format suitable for use by another component. In some implementations, the transceiver 226 may include support for devices attached through various types of peripheral buses, e.g., variants of the Peripheral Component Interconnect (PCI) bus standard or the Universal Serial Bus (USB) standard. In some other implementations, functions of the transceiver 226 may be split into two or more separate components, or integrated with the processor 222.

The media streaming device 280 may also be any type of device or devices capable of outputting visual and/or audible content, e.g., from the media distribution system 210 or any other sources of such content, and providing such content to the personal device 220 according to any protocols and by any wired or wireless techniques, e.g., a high-definition multimedia interface (HDMI) protocol, such as a Consumer Electronics Control (CEC) protocol. The media streaming device 280 includes a processor 282, a data store 284 and a transceiver 286, which may share one or more attributes, features or functions in common with the processor 222, the data store 224 or the transceiver 226, respectively, or may have one or more attributes, features or functions that are different from those of the processor 222, the data store 224 or the transceiver 226 of the personal device 220. In some implementations, the media streaming device 280 may also be capable of communicating with and controlling the personal device 220, e.g., to turn the personal device 220 on or off, to select an input source for the personal device 220, to adjust a volume of the personal device 220, or to otherwise control any other functions of the personal device 220.

Those of ordinary skill in the pertinent arts will recognize that the personal device 220 or the media streaming device 280 may include any number of hardware components or operate any number of software applications for receiving and rendering content received from the media distribution system 210 or other sources.

Moreover, those of ordinary skill in the pertinent arts will further recognize that, alternatively, in some implementations, the personal device 220 or the media streaming device 280 need not be associated with a given user. For example, the personal device 220 or the media streaming device 280 may be provided in a public place, beyond the control of any one user, e.g., a television provided in a bar, restaurant, transit station, or shopping center, or an electronic billboard provided in a population center or along a transit line, where any individuals may view and/or interact with video content rendered on the display 225.

Although the system 200 shown in FIG. 2 shows boxes for one media distribution system 210, one imaging device 215-1, one third party source 215-2, one personal device 220, one media streaming device 280 and one network 290, those of ordinary skill in the pertinent arts will recognize that any number of media distribution systems 210, imaging devices 215-1, third party sources 215-2, personal devices 220, media streaming devices 280 or networks 290 may be considered in accordance with the present disclosure. For example, multiple users may access, view and interact with content provided by multiple media distribution systems 210 (e.g., television channels or networks, marketplaces, social networks and any other content providers or sites), via multiple personal devices 220 or media streaming devices 280, and such content may include multiple types or forms of media provided by multiple content sources. Moreover, the personal devices 220 or the media streaming devices 280 with which users interact to access, view and interact with content may include all or fewer of the components shown in FIG. 2 or perform all or fewer of the functions described herein. For example, a user may view content on one personal device 220 or via one media streaming device 280, and execute interactions relating to that content on another personal device 220 or another media streaming device 280, using a remote control, a smartphone, a smart speaker, a smart wristwatch, or the like.

The network 290 may be any wired network, wireless network, or combination thereof, and may comprise the Internet, intranets, broadcast networks, cellular television networks, cellular telephone networks, satellite networks, or any other networks, in whole or in part. In addition, the network 290 may be a personal area network, local area network, wide area network, cable network, satellite network, cellular telephone network, or combination thereof, in whole or in part. The network 290 may also be a publicly accessible network of linked networks, possibly operated by various distinct parties, such as the Internet. In some implementations, video files may be provided by the media distribution system 210 to the personal device 220 or the media streaming device 280 over multiple networks 290. For example, a video file may be broadcast over the air or via satellite to a cable television provider, before being transmitted by the satellite or the provider to a receiver associated with the personal device 220, and shown on the display 225 and/or recorded in the data store 224. Alternatively, video files may be transmitted over a traditional computer network, such as the Internet, prior to reaching the personal device 220. In some implementations, the network 290 may include a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The server 212 and the personal device 220, and associated components, may use any web-enabled or Internet applications or features, or any other client-server applications or features, to connect to the networks 290, or to communicate with one another, such as through short or multimedia messaging service (SMS or MMS) text messages. For example, the server 212, the personal device 220 and the media streaming device 280 may be configured to transmit information or data in the form of synchronous or asynchronous messages to one another in real time or in near-real time, or in one or more offline processes, via the networks 290. Those of ordinary skill in the pertinent art would recognize that the server 212, the personal device 220 and the media streaming device 280 may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the processor 222, or the processor 282, or to any other computers or control systems utilized by the media distribution system 210, the personal device 220, or the media streaming device 280, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

As used herein, the terms "image," "video," "video program," or like terms, may refer to files comprising one or more images or video frames that are configured for broadcasting, airing, streaming or distributing in any manner, such as over any number of networks, or in a hard storage format (e.g., a DVD, a stick drive or another physically portable format). As used herein, the terms "sounds," "audio," "audio program," or like terms, may refer to files comprising one or more sounds or other acoustic signals that are also configured for broadcasting, airing, streaming or distributing in any manner, such as over any number of networks, or in a hard storage format. As used herein, the terms "program," "content" or "media" may refer to audio and/or video files that may be presented by one or more of a personal device directly, or by a personal device via a media streaming device, and may include but are not limited to information, data or metadata including or relating to such audio and/or video files.

Figure 3:
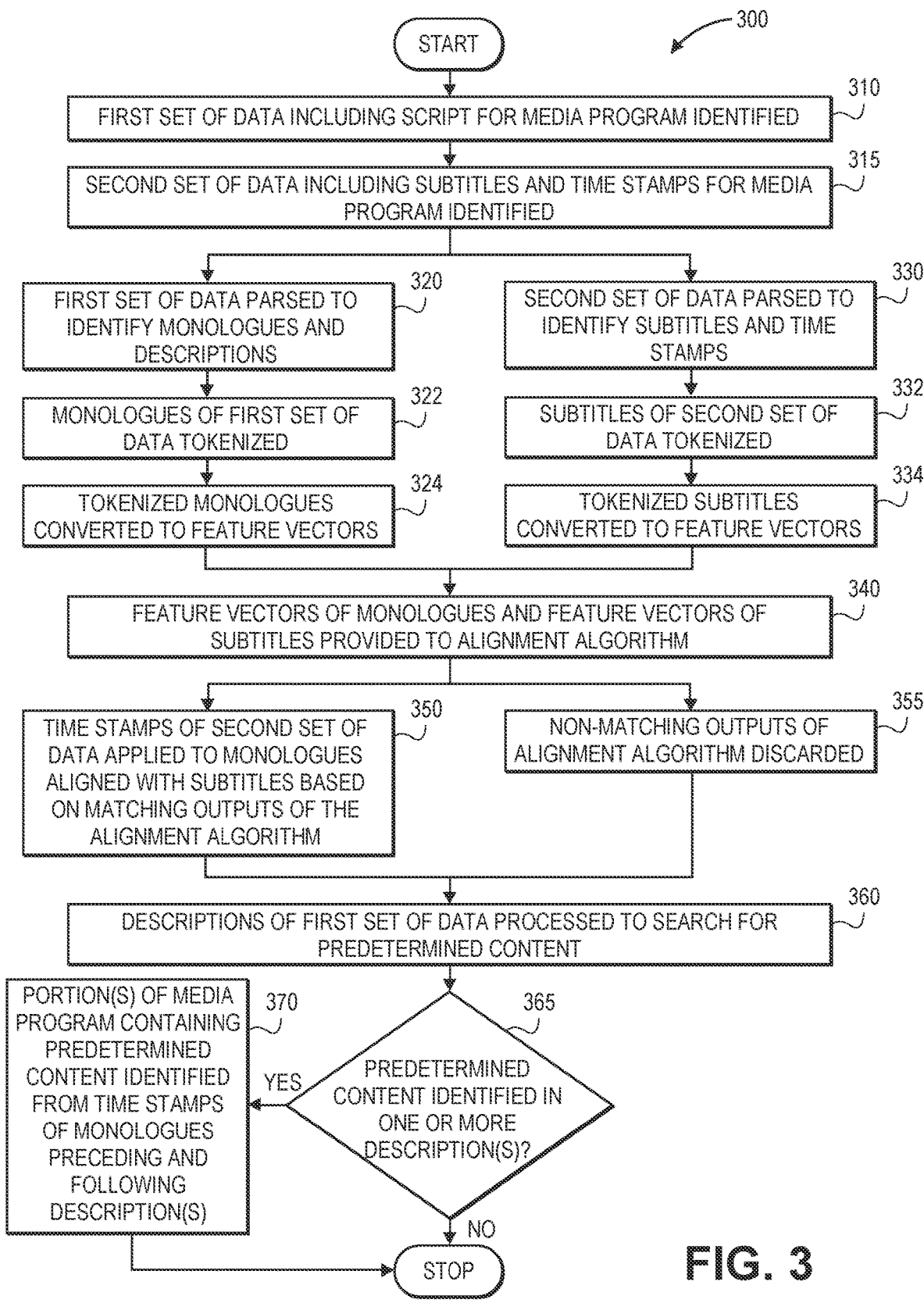
FIG. 3 is a flow chart of one process for determining visual content of media programs in accordance with implementations of the present disclosure.

Referring to FIG. 3, a flow chart 300 of one process for determining visual content of media programs in accordance with implementations of the present disclosure is shown. At box 310, a first set of data including a script (or a screenplay) for a media program is identified. The script may be any text-based outline or summary of the media program that includes words that are intended to be spoken by actors during the media program, such as monologues, dialogues or other sequences or conversations, as well as descriptions or narratives regarding points of interest during the media program that enable readers of the script (e.g., actors or production crews) to visualize what is intended to happen during such points of interest of the media program. The script may be prepared in a predetermined format that identifies or visually references content or elements of the script by headings, indentations, labels, transitions or other features.

The script may relate to any type or form of media program, including but not limited to a film, a movie or a television program of any length or duration, and in any format.

At box 315, a second set of data including subtitles and time stamps for the media program is identified. For example, the second set of data may include one or more files including text describing or representing supplemental information regarding the media program, such as words spoken by actors during the media program, as subtitles (or captions), along with any information, data or metadata including chapters, text-based descriptions or other metadata that relates to the media program. The second set of data may include one or more files of any format, e.g., a .VTT file saved in a web video text tracks format, which may have been received or derived from any source. The second set of data may include one or more time stamps that are applied to individual ones of the subtitles, such as a single time stamp identifying a single time associated with one of the subtitles, or a pair of time stamps indicating times bounding the respective subtitles, such as a first time stamp indicating a time at which one of the subtitles began and a second time stamp indicating a time at which one of the subtitles ended.

At box 320, the first set of data is parsed to identify monologues (or dialogues or other sequences or conversations including sets of words intended to be spoken by individual actors during the media program) and descriptions. For example, the first set of data may be pre-processed upon its receipt or ingestion based on a format of the first set of data, or according to one or more rules, to identify portions of the first set of data representing the monologues and portions of the first set of data representing descriptions. In some implementations, a script may be written in or converted to a predetermined format, under which aspects of the script such as headings, actions, character names, lines of speech, scene numbers, transitions or parentheticals are written in predetermined locations on pages or in predetermined fonts or styles. In such implementations, the script may be parsed according to the predetermined format, such that words appearing in the predetermined locations or in the predetermined fonts or styles may be identified as such. Alternatively, or additionally, the first set of data may be parsed to identify the monologues or descriptions in any other manner, e.g., according to one or more rules, or on any other basis.

At box 322, the monologues of the first set of data identified at box 320 are tokenized. For example, in some implementations, the monologues may be broken into sets of words, terms, sentences, or other meaningful elements, e.g., tokens. Tokenizing the monologues involves breaking the monologues into subsets of data that may be considered independently, e.g., as discrete elements. In some implementations, the monologues may be split based on spaces or other separators (e.g., commas, periods or other punctuation marks) between adjacent or respective discrete elements.

Alternatively, the monologues may be processed in any other manner, such as by stop word removal, where commonly appearing words such as articles or pronouns are removed, or stemming, where multiple forms of the same word are converted to a common stem, such as the words "receiving," "receipt," "reception" or "received," which may be converted to a single, common stem of "receive."

At box 324, the tokenized monologues are converted to one or more feature vectors. For example, in some implementations, a sparse matrix may be created for each of a plurality of words in a common vocabulary, with each row being a sentence vector having a length (e.g., a number of columns) equal to a size of the vocabulary. Alternatively, the tokenized monologues may be converted to feature vectors in any other manner.

In parallel, at box 330, the second set of data is parsed to identify the subtitles and the time stamps. The second set of data may be parsed in any manner based on a format of the second set of data, or according to one or more rules, to identify portions of the second set of data representing the subtitles and portions of the first set of data representing time stamps. The second set of data may be parsed in the same manner as the first set of data at box 320, or in a different manner, e.g., according to one or more rules, or on any other basis.

At box 332, the subtitles of the second set of data are tokenized. The subtitles of the second set of data may be tokenized in the same manner as the monologues of the first set of data at box 322, or in any other manner.

At box 334, the tokenized subtitles are converted to one or more feature vectors. The tokenized subtitles may be converted to feature vectors in the same manner as the tokenized monologues of the first set of data at box 324, or in any other manner.

After the words of the monologues and the words of the subtitles have been converted to one or more feature vectors at boxes 324 and 334, the process advances to box 340, where the feature vectors of the monologues and the feature vectors of the subtitles are provided to an alignment algorithm. For example, in some implementations, the alignment algorithm may be a dynamic time warping algorithm, or any other algorithm, that determines similarities between pairs of sequences, e.g., feature vectors representing monologues and feature vectors representing subtitles, and identifies optimal matches, where possible, between one of the feature vectors representing one of the monologues and one of the feature vectors representing one of the subtitles. Alternatively, any other alignment algorithm may be used.

At box 350, the time stamps of the second set of data are applied to the monologues that align with the subtitles based on matching outputs of the alignment algorithm. For example, where a feature vector generated based on a subtitle is identified as a match for a feature vector generated based on a monologue, one or more time stamps associated with the subtitle may be applied to the monologue.

In parallel, at box 355, non-matching outputs of the alignment algorithm are disregarded. For example, in some implementations, discrepancies between the script and the monologues may be identified where a feature vector representing a monologue does not match with any feature vectors representing subtitles, or vice versa. Where a discrepancy associated with a subtitle is identified, e.g., where the subtitle does not match any of the monologues, time stamps associated with the subtitle may not be applied to any of the monologues. Likewise, where a discrepancy associated with a monologue is identified, e.g., where the monologue does not match any of the subtitles, identifying a description proximate the monologue may be difficult or unreliable. Discrepancies between monologues and subtitles may exist for any reason, such as where an actor has intentionally or unintentionally deviated from the script, where changes are made to the media program after the script was written but before the media program was recorded, or where producers added, removed or rearranged scenes of the media program.

At box 360, descriptions of the first set of data are processed to determine whether such descriptions contain any predetermined content, such as words, phrases or terms that are known or believed to be associated with specific kinds of visual content of interest that is or may be subject to regulation or moderation, e.g., images depicting age-restricted themes, violence, sexually oriented nudity, use or abuse of alcohol, tobacco or other drugs, or others. For example, one or more of the descriptions embodied in the first set of data may be processed to search for key terms or phrases, e.g., "heroin," "duel," or "riot." Alternatively, or additionally, one or more of the descriptions may be provided to a natural language processing algorithm, system or technique to search for topics relating to drugs, sexuality or violence. The predetermined content may be defined on any basis or according to any standard in accordance with implementations of the present disclosure.

At box 365, whether any of the predetermined content is identified in one or more of the descriptions of the first set of data is determined. If none of the predetermined content is identified in any of the descriptions, then the process ends.

If any of the predetermined content is identified in one or more of the descriptions of the first set of data, however, then the process advances to box 370, where one or more portions of the media program containing the predetermined content are identified based on the time stamps of the monologues that precede and follow such descriptions, and the process ends. Once the portions of the media program containing the predetermined content have been identified, such portions may be utilized or processed on any basis. For example, portions of the media program containing the predetermined content may be provided to one or more human operators, who may review the portions of the media program and confirm or validate whether such portions contain the predetermined content, or identify or modify boundaries of the portions of the media program that contain the predetermined content. Alternatively, or additionally, such portions may then be considered for modification, e.g., to reduce an incidence of the predetermined content presented therein, or to eliminate one or more video frames depicting the predetermined content from the media program. For example, a version of the media program that omits the portions having the predetermined content may be generated and presented to viewers, e.g., with a lower or less restrictive rating than the original unaltered media program.

The steps of the process represented in the flow chart 300 of FIG. 3 may also be performed or completed any number of instances, occasions or cycles, for any number of types or forms of predetermined content, e.g., age-restricted themes, violence, sexually oriented nudity, alcohol, tobacco, drugs or others. For example, in some implementations, the process represented in the flow chart 300 of FIG. 3 may be performed in its entirety for one type or form of predetermined content, e.g., to determine whether any descriptions in a script reference an age-restricted theme, and to identify portions of a media program corresponding to such descriptions. The process represented in the flow chart 300 of FIG. 3 may then be repeated for any other types or forms of predetermined content, e.g., to determine whether any descriptions in the script reference violence, nudity, drugs or others, and to identify portions of a media program corresponding to such descriptions. Moreover, a single description may be identified as referencing multiple types or forms of predetermined content, e.g., two or more of age-restricted themes, violence, sexually oriented nudity and drugs, or others, e.g., by performing or completing the process represented in the flow chart 300 of FIG. 3 any number of instances, occasions or cycles, for any number of types or forms of predetermined content, e.g., age-restricted themes, violence, sexually oriented nudity, alcohol, tobacco, drugs or others.

The steps of the process represented in the flow chart 300 of FIG. 3 may also be performed or completed in any order. For example, in some implementations, a script may be parsed to identify monologues and descriptions, and the descriptions may be processed to determine whether any of such descriptions contain predetermined content, e.g., images depicting age-restricted themes, violence, sexually oriented nudity, use or abuse of alcohol, tobacco or other drugs, or others. In the event that none of the descriptions contain the predetermined content, no further processing need be required. In the event that one or more of the descriptions contains the predetermined content, however, the monologues of the script and a file or record containing subtitles that are marked or stamped with times may be processed to generate feature vectors of the respective monologues or subtitles. Where feature vectors generated from the subtitles are determined to match with feature vectors generated from the monologues, time stamps of the subtitles may be associated with the monologues, and a portion of the media program corresponding to the descriptions containing the predetermined content may be identified from such time stamps.

In some implementations, a script may include elements such as sets of words intended to be spoken by one or more actors during a media program (e.g., monologues, dialogues or other sequences or conversations), as well as descriptions of aspects of the media program, or other elements, that may be identified by parsing a data file or record including the script. For example, in some implementations, elements of a script may be provided in predetermined locations of a paper or electronic document, according to a predetermined format. To parse elements from the script, the predetermined locations of the document may be searched, and data provided in such locations may be presumed to be one of the elements of the script corresponding to such locations.

Figure 4:
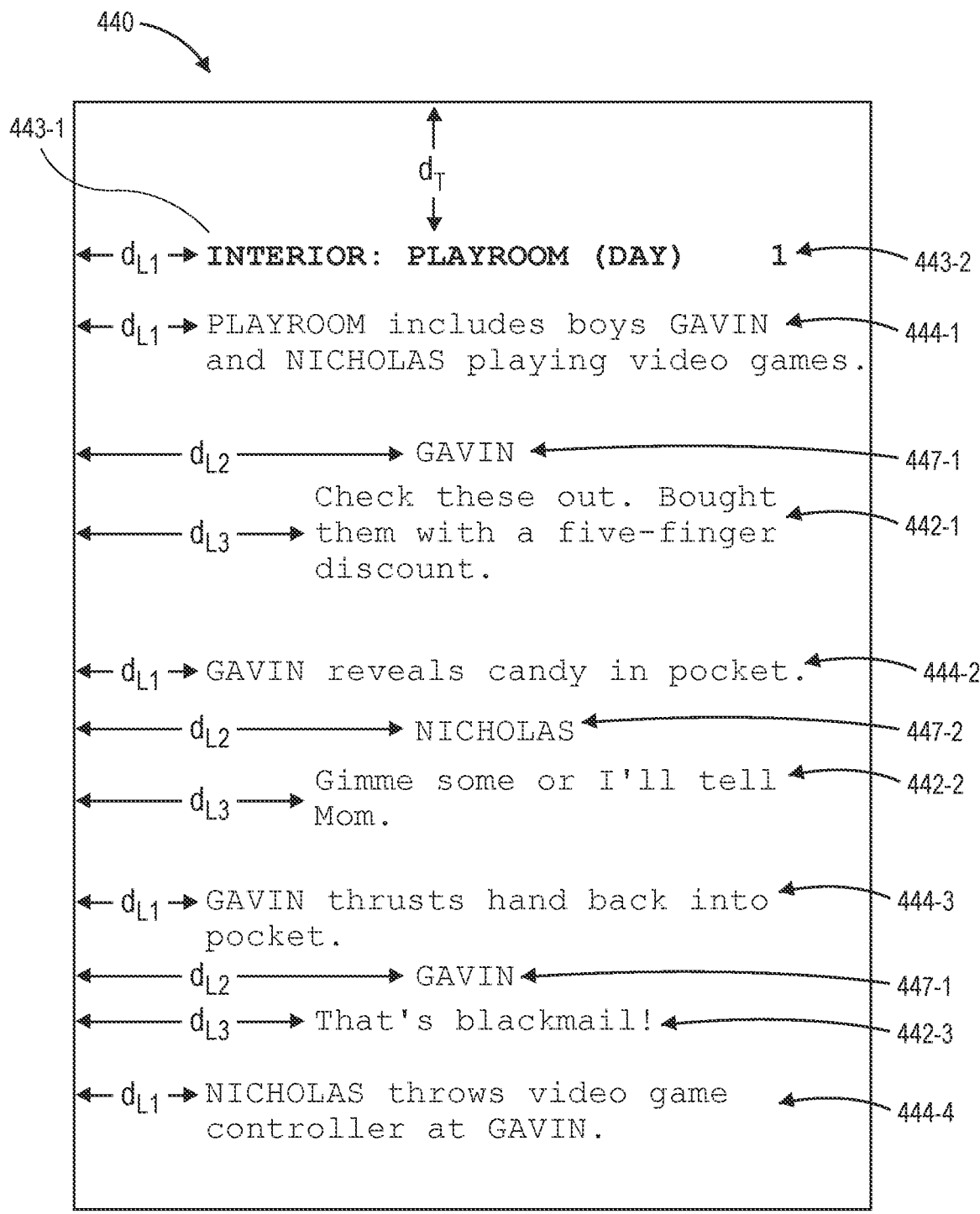
FIG. 4 is a view of aspects of one system for determining visual content of media programs in accordance with implementations of the present disclosure.

Referring to FIG. 4, a view of aspects of one system for determining visual content of media programs in accordance with implementations of the present disclosure is shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1G.

As is shown in FIG. 4, a portion of a script 440 includes a plurality of elements that are provided in specific locations within a document (e.g., on paper or electronically). For example, the script 440 includes a plurality of sets of words (e.g., monologues, dialogues or other sequences or conversations) 442-1, 442-2, 442-3 that are intended to be spoken by actors during a media program, arranged in an order or sequence in which the sets of words 442-1, 442-2, 442-3 are to be spoken, as well as descriptions 444-1, 444-2, 444-3, 444-4 of aspects of the media program. The script 440 further includes scene identifiers 443-1, 443-2, including a name (or label) 443-1 of a scene or a time of day, and a number 443-2 of the scene. The script 440 further includes identifiers (e.g., names) 447-1, 447-2 of actors who are intended to speak specific ones of the sets of words 442-1, 442-2, 442-3.

The elements of the script 440 are provided in specific locations. For example, as is shown in FIG. 4, the scene identifier 443-1 and the scene identifier 443-2 are shown in bold face and capital letters, and are provided not nearer than a top margin dT from an upper edge of a document, e.g., a piece of paper on which the script 440 is printed or an electronic document (e.g., a scanned image or a user interface) in which the script 440 is rendered. Additionally, the scene identifier 443-1 and each of the descriptions 444-1, 444-2, 444-3, 444-4 are justified along a left margin $d_{L1}$ from a left edge of the document. The identifiers 447-1, 447-2 of the actors are also shown in capital letters justified along a left margin $d_{L2}$ from the left edge of the document or, alternatively, are centered horizontally across the document. The sets of words 442-1, 442-2, 442-3 to be spoken by the actors are justified along a left margin $d_{L3}$ from the left edge of the document.

Moreover, in some implementations, each of the elements of the script 440 may be presented in a common font, e.g., Courier or another monospaced font. Alternatively, elements of the script 440 may be presented in other or different fonts. Furthermore, in some implementations, specific elements of the script 440 may be displayed or rendered in different manners. For example, as is shown in FIG. 4, the identifiers 447-1, 447-2 of the actors are shown in all capital letters, while the scene identifiers 443-1, 443-2 are shown in all capital letters and in bold face. Alternatively, elements of the script 440 may be displayed or rendered in any other manner.

Therefore, where a document representing a script is identified, the specific locations of the script may be searched to identify information or data represented therein, and the information or data may be classified or labeled as a discrete element (e.g., a set of words, or a description) based on the specific location in which the information or data is represented. Thus, where sets of words or other characters are at the top margin $d_T$ from an upper edge of a document, in capital letters or in bold face, such words or characters may be presumed to be identifiers of scenes of a media program. Where sets of words are justified along a left margin $d_{L1}$ from a left edge of a document, such sets of words may be presumed to be descriptions of aspects of a media program, or identifiers of scenes of the media program. Where sets of words are justified along a left margin $d_{L2}$ from a left edge of a document, or centered across the document, such sets of words may be presumed to be identifiers of actors in a media program. Where sets of words are justified along a left margin $d_{L3}$ from a left edge of a document, such sets of words may be presumed to be monologues, dialogues or other sequences or conversations, or otherwise intended to be spoken by actors during a media program. Alternatively, locations of sets of words or characters in a document may be referenced in any other manner, e.g., with respect to a lower edge or right edge of the document, and identified as elements of a script based on their respective locations within the document.

A set of data including or containing subtitles and time stamps may also be processed, as necessary, to parse the set of data and to identify subtitles and time stamps therein, prior to tokenizing the subtitles, and vectorizing the tokenized subtitles.

As is discussed above, portions of a script of a media program may be aligned with corresponding portions of subtitles or captions of the media program by an alignment algorithm, such as a dynamic time warping algorithm. For portions of a script that are identified as being aligned with corresponding portions of the subtitles or captions, time stamps of the subtitles or captions may be applied to the portions of the script. Where substantial discrepancies between the script and the subtitles or captions are identified by the alignment algorithm, however, discrepant portions of the script or the subtitles may be disregarded, or may be understood to be unreliable in identifying descriptions of the video content from the script.

Figure 5A:
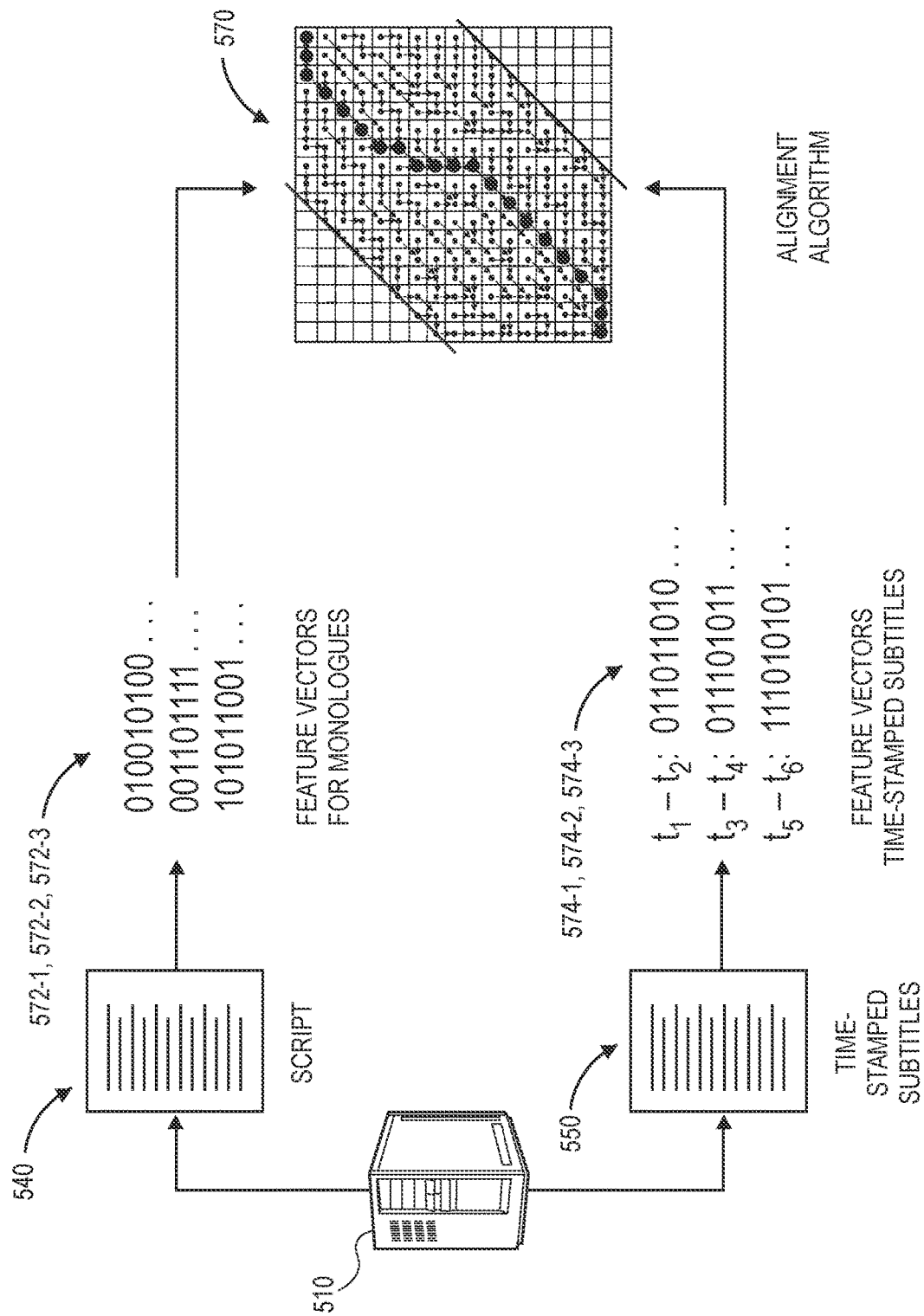
FIGS. 5A and 5B are views of aspects of one system for determining visual content of media programs in accordance with implementations of the present disclosure.
Figure 5B:
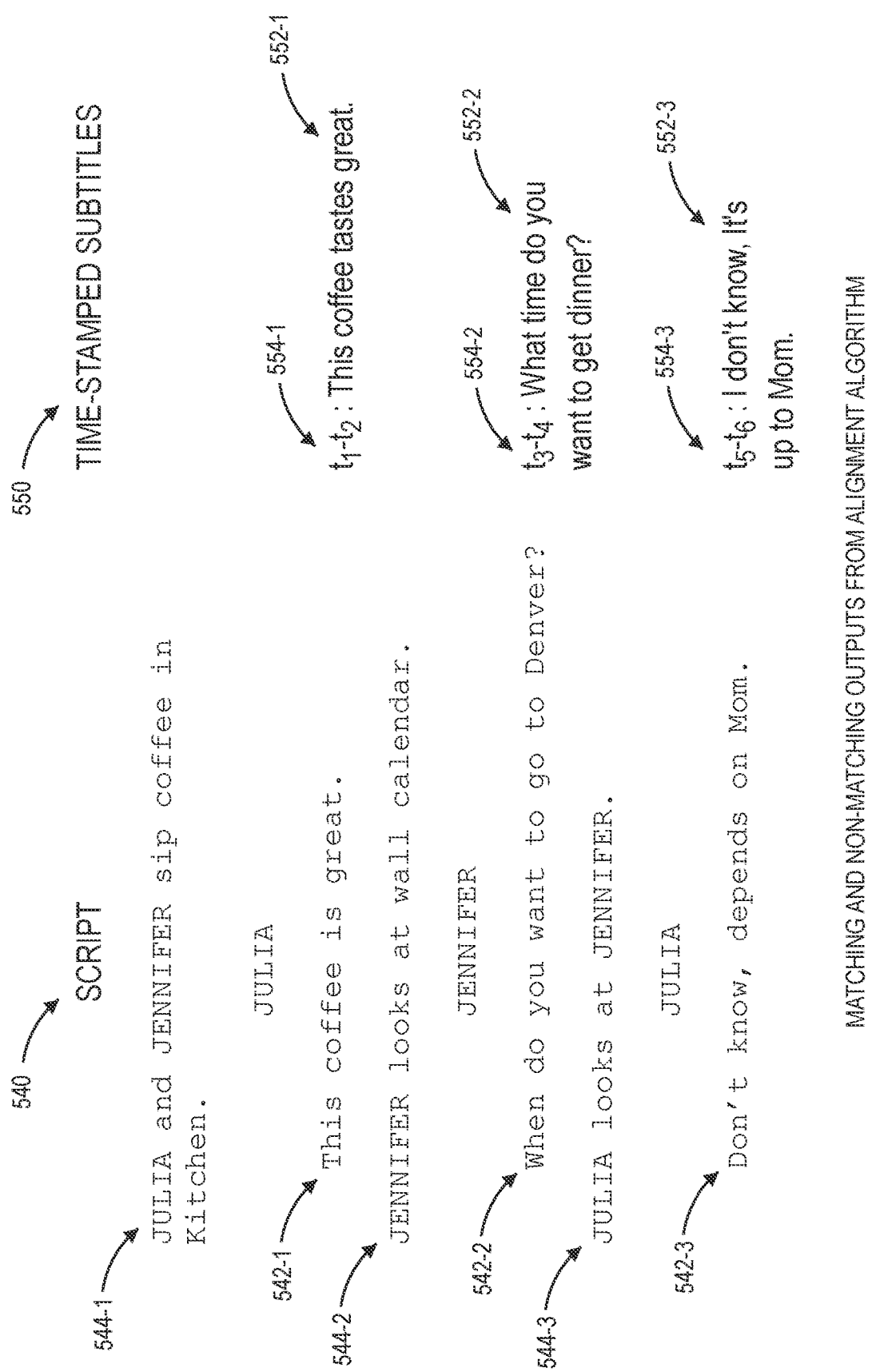

Referring to FIGS. 5A and 5B, views of aspects of one system for determining visual content of media programs in accordance with implementations of the present disclosure is shown. Except where otherwise noted, reference numerals preceded by the number "5" shown in FIG. 5A or FIG. 5B indicate components or features that are similar to components or features having reference numerals preceded by the number "4" shown in FIG. 4, by the number "2" shown in FIG. 2 or by the number "1" shown in FIGS. 1A through 1G.

As is shown in FIG. 5A, a media distribution system 510 (or another computer device or system) may identify data representing a script 540 of a media program and data representing time-stamped subtitles 550 of the media program. The media distribution system 510 may parse the script 540 to identify sets of words that are intended to be spoken by actors during the media program and descriptions thereof, to tokenize the sets of words, and to vectorize each of the sets of words into feature vectors 572-1, 572-2, 572-3. Similarly, the media distribution system 510 may tokenize the subtitles 550, and to vectorize the subtitles 550 into feature vectors 574-1, 574-2, 574-3. The feature vectors 572-1, 572-2, 572-3 generated from the sets of words of the script 540 and the feature vectors 574-1, 574-2, 574-3 generated from the subtitles 550 may be provided to an alignment algorithm 570 to determine which of the feature vectors 572-1, 572-2, 572-3 match one the feature vectors 574-1, 574-2, 574-3, and which of the feature vectors 572-1, 572-2, 572-3 do not match any of the feature vectors 574-1, 574-2, 574-3.

The alignment algorithm 570 may be a dynamic time warping algorithm, or any other algorithm, that determines similarities between pairs of sequences, e.g., feature vectors representing monologues (or dialogues or other sequences or conversations) and feature vectors representing subtitles, and identifies optimal matches, where possible, between one of the feature vectors representing one of the monologues and one of the feature vectors representing one of the subtitles. Alternatively, any other alignment algorithm may be used.

As is shown in FIG. 5B, the script 540 includes a plurality of sets of words 542-1, 542-2, 542-3 to be spoken by actors during a media program, and descriptions 544-1, 544-2, 544-3 of aspects of the media program. For example, according to the script 540, the description 544-1 indicates that "JULIA and JENNIFER sip coffee in Kitchen," and one of the actors, viz., "JULIA," is to utter the set of words 542-1, "This coffee is great." Next, the description 544-2 indicates that "JENNIFER looks at wall calendar," before uttering the set of words 542-2, "when do you want to go to Denver?" Finally, the description 544-3 indicates one of the actors, "JULIA," is to look at the other actor, "JENNIFER," before uttering the set of words 542-3, "Don't know, depends on Mom."

As is further shown in FIG. 5B, the time-stamped subtitles 550 indicate that the set of words 552-1, or "This coffee tastes great," were actually uttered between a time $t_1$ and a time $t_2$ of the media program, according to a time stamp 554-1. The time-stamped subtitles 550 further indicate that the set of words 552-2, or "What time do you want to get dinner?" were actually uttered between a time $t_3$ and a time $t_4$ of the media program, according to a time stamp 554-2. The time-stamped subtitles 550 also indicate that the set of words 552-3, or "I don't know, it's up to Mom," were actually uttered between a time $t_5$ and a time $t_6$ of the media program, according to a time stamp 554-3.

In accordance with some implementations of the present disclosure, the alignment algorithm 570 may identify the sets of words 542-1, 542-2, 542-3 that align with the sets of words 552-1, 552-2, 552-3, and also identify sets of words 542-1, 542-2, 542-3 that do not align with any of the sets of words 552-1, 552-2, 552-3, according to any standard. For example, the alignment algorithm 570 may determine that the set of words 542-1 of the script 540, or "This coffee is great," aligns with the set of words 552-1 of the subtitles 570, or "This coffee tastes great," based on the logical or semantic similarity between the respective sets of words. Accordingly, the time stamp 554-1 associated with the set of words 552-1 may be assigned to or associated with the set of words 542-1 accordingly.

Similarly, the alignment algorithm 570 may determine that the set of words 542-3 of the script 540, or "Don't know, depends on Mom," aligns with the set of words 552-3 of the subtitles 570, or "I don't know, it's up to Mom," based on the logical or semantic similarity between the respective sets of words. Accordingly, the time stamp 554-3 associated with the set of words 552-3 may be assigned to or associated with the set of words 542-3 accordingly.

However, the alignment algorithm 570 may also determine that the set of words 542-2 of the script 540, or "When do you want to go to Denver?" does not align with the set of words 552-2 of the subtitles 550, or "What time do you want to get dinner?" where the sets of words 542-2, 552-2 are not logically or semantically similar. Because the words that were actually spoken during the media program, or the set of words 552-2, do not align with the words that were intended to be spoken according to the script 540, the time stamp 554-2 may not be associated with the set of words 542-2.

Once the time stamps 554-1, 554-3 have been associated with the sets of words 542-1, 542-3, the time stamps 554-1, 554-3 may be used to identify portions of the media program corresponding to the descriptions 544-1, 544-2, 544-3, which may be processed to determine whether any of such portions depict predetermined content that may be subject to regulation or moderation, e.g., adult themes, violence, drug use or abuse, sexually oriented nudity, or others.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 3, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or two left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A media distribution system comprising:
    at least one computer processor; and
    at least one data store,
    wherein the data store has instructions stored thereon that, when executed by the at least one computer processor, cause the media distribution system to perform a method comprising:
    identifying first data regarding a script of a media program, wherein the script comprises a first plurality of sets of words intended to be spoken by actors during the media program and a plurality of descriptions of the media program;
    identifying second data regarding a set of subtitles of the media program, wherein the second data comprises a second plurality of sets of words actually spoken by actors during the media program and a plurality of times, wherein each of the plurality of times is associated with one of the second plurality of sets of words;
    providing each of the first plurality of sets of words and each of the second plurality of sets of words as inputs to an alignment algorithm;
    determining that a first set of words of the first plurality of sets of words corresponds to a second set of words of the second plurality of sets of words based at least in part on at least one output received from the alignment algorithm in response to the inputs;
    in response to determining that the first set of words corresponds to the second set of words,
        identifying a time associated with the second set of words;
        selecting one of the plurality of descriptions based at least in part on the first set of words;
        determining that the one of the plurality of descriptions references predetermined content; and
        storing an indication that the media program depicts the predetermined content at the time associated with the second set of words.

2. The media distribution system of claim 1, wherein the second set of data is a Video Text Track file.

3. The media distribution system of claim 1, wherein the determining that the one of the plurality of descriptions references the predetermined content comprises at least one of:
    providing at least the one of the plurality of descriptions to a natural language processing algorithm as an input; and
    determining that the one of the plurality of descriptions references the predetermined content based at least in part on an output received in response to the input.

4. The media distribution system of claim 1, wherein the first set of words precedes or follows the one of the descriptions in the script.

5. The media distribution system of claim 1, wherein the predetermined content relates to one of:
   an age-restricted theme;
   violence;
   nudity; or
   use or abuse of alcohol, tobacco or drugs.

6. A computer-implemented method comprising:
   identifying a first set of data regarding a media program, wherein the first set of data comprises:
      a plurality of sets of words intended to be spoken during the media program; and
      a plurality of sets of words describing portions of the media program;
   identifying a second set of data regarding the media program, wherein the second set of data comprises:
      a plurality of sets of words spoken during the media program; and
      a plurality of times, wherein each of the times is associated with one of the plurality of sets of words spoken during the media program;
   determining that a first set of words of the plurality of sets of words spoken during the media program corresponds to a second set of words of the plurality of sets of words intended to be spoken during the media program;
   identifying at least a first time associated with the first set of words, wherein the first time is one of the plurality of times;
   associating at least the first time with the second set of words;
   identifying a third set of words of the plurality of sets of words describing the portions of the media program based at least in part on the second set of words; and
   determining whether at least a portion of the media program associated with the first time represents predetermined content based at least in part on the third set of words.

7. The computer-implemented method of claim 6, wherein the first set of data represents a script of the media program, and
   wherein identifying the first set of data comprises:
      parsing the script of the media program to identify the plurality of sets of words intended to be spoken during the media program and the plurality of sets of words describing the portions of the media program.

8. The computer-implemented method of claim 7, wherein the third set of words precedes or follows the second set of words in the script.

9. The computer-implemented method of claim 6, wherein the second set of data is a Video Text Track file, and
   wherein each of the plurality of sets of words spoken during the media program is one of a subtitle or a caption.

10. The computer-implemented method of claim 6, wherein the first set of data is a document according to a predetermined format, and
    wherein the computer-implemented method further comprises:
       determining at least one of a first location or a first margin associated with sets of words intended to be spoken during the media program;
       determining at least one of a second location or a second margin associated with sets of words describing portions of the media program;
       identifying each of the plurality of sets of words intended to be spoken during the media program within the document based at least in part on at least one of the first location or the first margin; and
       identifying each of the plurality of sets of words describing portions of the media program within the document based at least in part on at least one of the second location or the second margin.

11. The computer-implemented method of claim 6, wherein determining that the first set of words corresponds to the second set of words comprises:
    providing each of the plurality of sets of words intended to be spoken during the media program and the each of the plurality of sets of words spoken during the media program to an alignment algorithm as inputs; and
    determining at least that the first set of words corresponds to the second set of words based at least in part on at least one output received from the alignment algorithm in response to the inputs.

12. The computer-implemented method of claim 6, wherein determining whether the portion of the media program associated with the first time represents the predetermined content further comprises:
    determining that a fourth set of words of the plurality of sets of words spoken during the media program does not correspond to a fifth set of words of the plurality of sets of words intended to be spoken during the media program;
    identifying at least a second time associated with the fourth set of words, wherein the second time is one of the plurality of times;
    associating at least the second time with the fifth set of words; and
    identifying a sixth set of words of the plurality of sets of words describing the portions of the media program based at least in part on the second time,
    wherein whether at least the portion of the media program associated with the first time represents the predetermined content is not determined based at least in part on the sixth set of words.

13. The computer-implemented method of claim 6, wherein determining whether at least the portion of the media program associated with the first time represents the predetermined content further comprises:
    providing at least the plurality of words describing the portions of the media program as inputs to a natural language processing algorithm;
    receiving outputs from the natural language processing algorithm in response to the inputs, wherein the outputs comprise confidence scores indicating whether one of the plurality of words describing the portions of the media program represents the predetermined content; and
    identifying one of the outputs corresponding to the portion of the media program associated with the first time,
    wherein whether the one of the plurality of words describing the portions of the media program represents the predetermined content is determined based at least in part on the one of the outputs and a predetermined threshold.

14. The computer-implemented method of claim 6, wherein determining that the first set of words corresponds to the second set of words comprises:
    generating a first feature vector based at least in part on the first set of words;
    generating a second feature vector based at least in part on the second set of words; and determining that the first feature vector corresponds to the second feature vector.

15. The computer-implemented method of claim 6, wherein the predetermined content relates to one of:
an age-restricted theme;
violence;
nudity; or
use or abuse of alcohol, tobacco or drugs.

16. A computer-implemented method comprising:
identifying a script for a media program, wherein the script comprises:
a first plurality of sets of words, wherein each of the first plurality of sets of words describes a portion of the media program; and
a second plurality of sets of words, wherein each of the second plurality of sets of words is intended to be spoken by at least one actor during the media program;
determining that a first set of words of the first plurality of sets of words describes predetermined content;
in response to determining that the first set of words describes the predetermined content,
identifying a set of data regarding the media program, wherein the set of data comprises:
a third plurality of sets of words, wherein each of the third plurality of sets of words was spoken by at least one actor during the media program; and
a plurality of times, wherein each of the plurality of times is a time during the media program associated with one of the third plurality of sets of words;
providing at least some of the second plurality of sets of words and at least some of the third plurality of sets of words as inputs to an alignment algorithm;
identifying a second set of words of the second plurality of sets of words that aligns with a third set of words of the third plurality of sets of words based at least in part on at least one output from the alignment algorithm;
determining a first time during the media program associated with the third set of words, wherein the first time is one of the plurality of times;
associating the first time with the second set of words;
determining a second time during the media program associated with the first set of words based at least in part on the first time; and
storing an indication that a portion of the media program associated with the second time includes the predetermined content in at least one data store.

17. The computer-implemented method of claim 16, wherein the second set of words precedes or follows the first set of words in the script.

18. The computer-implemented method of claim 16, wherein the alignment algorithm is a dynamic time warping algorithm.

19. The computer-implemented method of claim 16, further comprising:
identifying a fourth set of words of the second plurality of words that does not align with a fifth set of words of the third plurality of words based at least in part on the at least one output from the alignment algorithm; and
determining a third time during the media program associated with the fifth set of words, wherein the third time is one of the plurality of times,
wherein that the portion of the media program is associated with the second time includes the predetermined content is not determined based on the third time or the fourth set of words.

20. The computer-implemented method of claim 16, wherein the predetermined content relates to one of:
an age-restricted theme;
violence;
nudity; or
use or abuse of alcohol, tobacco or drugs.

* * * * *